United States Patent
Chari et al.

(10) Patent No.: US 6,425,006 B1
(45) Date of Patent: *Jul. 23, 2002

(54) ALERT CONFIGURATOR AND MANAGER

(75) Inventors: Srikumar N. Chari, Cupertino; Kenny L. Bright, Hayward, both of CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 08/942,005

(22) Filed: Oct. 1, 1997

Related U.S. Application Data

(60) Provisional application No. 60/046,310, filed on May 13, 1997.

(51) Int. Cl.[7] .............................................. G06F 15/173
(52) U.S. Cl. ..................... 709/224; 709/202; 709/203; 709/223; 370/242; 714/37; 714/47; 714/48
(58) Field of Search ................................ 709/702, 703, 709/223, 224; 370/242; 214/39, 47, 48

(56) References Cited

U.S. PATENT DOCUMENTS

| | | | |
|---|---|---|---|
| 4,999,787 A | 3/1991 | McNally et al. ............. 364/514 |
| 5,210,855 A | 5/1993 | Bartol | |
| 5,261,044 A | 11/1993 | Dev et al. .................... 345/357 |
| 5,274,680 A | 12/1993 | Sorton et al. ................ 375/118 |
| 5,340,340 A | 8/1994 | Hastings et al. .............. 439/64 |
| 5,386,567 A | 1/1995 | Lien et al. ................... 395/700 |
| 5,487,148 A | * 1/1996 | Komori et al. ......... 395/182.02 |
| 5,491,796 A | 2/1996 | Wanderer et al. ...... 395/200.09 |
| 5,517,646 A | 5/1996 | Piccirillo et al. | |
| 5,546,595 A | 8/1996 | Norman et al. .............. 395/800 |
| 5,555,510 A | 9/1996 | Verseput et al. | |
| 5,561,769 A | 10/1996 | Kumar et al. .......... 395/200.05 |
| 5,576,946 A | 11/1996 | Bender et al. ............... 364/146 |
| 5,579,491 A | 11/1996 | Jeffries et al. | |
| 5,581,712 A | 12/1996 | Herrman | |
| 5,621,892 A | * 4/1997 | Cook ......................... 709/224 |

(List continued on next page.)

FOREIGN PATENT DOCUMENTS

| | | |
|---|---|---|
| EP | 0520770 A2 | * 12/1992 |
| NL | 95/09387 | * 4/1999 |
| SE | 96/24899 | * 8/1996 |

OTHER PUBLICATIONS

Chao et al., Global Telecommunications Conference, Globecom '91, vol. 2, pp. 968–975, 1991, "Transport of Gigabit/sec Data Packets over SONET/ATM Networks.".

Hsiao, S. and C.Y. Chen, Parallel Processing Symposium, pp. 773–777, IEEE 1993, "A New Model for the Performance Evaluation of Synchronous Circuit Switched Multistage Interconnection Networks.".

Tsun–yuk Hsu, W. and P.C. Yew, Parallel Processing Symposium, pp. 309–317, IEEE 1991, "An Effective Synchronization Network for Large Multiprocessor Systems.".

(List continued on next page.)

*Primary Examiner*—Saleh Najjar
(74) *Attorney, Agent, or Firm*—Knobbe, Martens, Olson & Bear, LLP

(57) ABSTRACT

An apparatus for creating, registering, and monitoring alerts for a computer or plurality of computers. This apparatus alerts the operator when an event occurs on one of the completer's components. This apparatus allows the user to select which alerts to enable and which alerts to disable from a list of all possible alerts. When an alert occurs, the present invention displays the particular computer's name, a description of the alert, the time and date of the alert; and details about a recommended course of action. The present invention also creates a log file for all alerts detected, regardless of whether the alert is displayed or not.

34 Claims, 13 Drawing Sheets

U.S. PATENT DOCUMENTS

| | | | |
|---|---|---|---|
| 5,638,289 A | | 6/1997 | Yamada et al. |
| 5,651,006 A | | 7/1997 | Fujino et al. ............... 370/408 |
| 5,652,892 A | | 7/1997 | Ugajin ....................... 395/750 |
| 5,655,081 A | * | 8/1997 | Bonnell et al. ........ 395/200.32 |
| 5,666,362 A | | 9/1997 | Chen et al. ................. 370/420 |
| 5,671,441 A | | 9/1997 | Glassen et al. |
| 5,678,006 A | | 10/1997 | Valizadeh et al. ..... 395/200.02 |
| 5,678,042 A | | 10/1997 | Pisello et al. |
| 5,684,945 A | | 11/1997 | Chen et al. ............ 395/182.18 |
| 5,689,637 A | * | 11/1997 | Johnson et al. ........ 395/183.22 |
| 5,696,486 A | * | 12/1997 | Poliquin et al. ............ 340/506 |
| 5,710,908 A | | 1/1998 | Man ........................... 395/500 |
| 5,745,897 A | | 4/1998 | Perkins et al. .............. 707/101 |
| 5,748,098 A | * | 5/1998 | Grace ..................... 340/825.16 |
| 5,751,575 A | | 5/1998 | Hirosawa et al. ........... 364/188 |
| 5,751,933 A | * | 5/1998 | Dev et al. ....................... 714/4 |
| 5,754,426 A | | 5/1998 | Dumais ....................... 364/188 |
| 5,758,103 A | | 5/1998 | Oh .............................. 395/283 |
| 5,761,085 A | * | 6/1998 | Giorgio ....................... 364/505 |
| 5,761,429 A | | 6/1998 | Thompson ............. 395/200.54 |
| 5,764,911 A | | 6/1998 | Tezuka et al. ......... 395/200.53 |
| 5,764,913 A | * | 6/1998 | Jancke et al. .......... 395/200.54 |
| 5,768,541 A | | 6/1998 | Pan-Ratzlaff ................ 395/283 |
| 5,774,667 A | | 6/1998 | Garvey et al. ......... 395/200.52 |
| 5,781,798 A | | 7/1998 | Betty et al. |
| 5,784,576 A | | 7/1998 | Guthrie et al. .............. 395/283 |
| 5,787,246 A | | 7/1998 | Lichtman et al. |
| 5,796,633 A | | 8/1998 | Burgess et al. ........ 364/551.01 |
| 5,799,016 A | | 8/1998 | Onweller .................... 370/401 |
| 5,802,146 A | * | 9/1998 | Dulman ........................ 379/34 |
| 5,812,750 A | * | 9/1998 | Dev et al. ............. 395/182.02 |
| 5,815,652 A | * | 9/1998 | Ote et al. ...................... 714/31 |
| 5,826,046 A | | 10/1998 | Nguyen et al. ............. 395/309 |
| 5,838,319 A | | 11/1998 | Guzak et al. ............... 345/340 |
| 5,862,333 A | * | 1/1999 | Graf ............................ 709/223 |
| 5,892,912 A | | 4/1999 | Suzuki et al. .......... 395/200.48 |
| 5,901,304 A | | 5/1999 | Hwang et al. .............. 395/500 |
| 5,907,610 A | | 5/1999 | Onweller .................... 379/242 |
| 5,910,954 A | | 6/1999 | Bronstein et al. ........... 370/401 |
| 5,913,037 A | | 6/1999 | Spofford et al. ....... 395/200.56 |
| 5,918,004 A | | 6/1999 | Anderson et al. ....... 395/183.14 |
| 5,919,258 A | * | 7/1999 | Kayashima et al. ......... 713/201 |
| 5,922,051 A | | 7/1999 | Sidey .......................... 709/223 |
| 5,944,782 A | * | 8/1999 | Noble et al. ................. 709/202 |
| 5,961,596 A | | 10/1999 | Takubo et al. .............. 709/224 |
| 6,000,045 A | | 12/1999 | Lewis ........................... 714/47 |
| 6,023,507 A | | 2/2000 | Wookey ....................... 380/21 |

OTHER PUBLICATIONS

Yun, K. and D. Dill, Computer Aided Design, pp. 255–260, IEEE 1993, "Unifying Synchronous/Asynchronous State Machine Synthesis.".

"Plug and Play BIOS Specification", Compaq Computer Corporation Phoenix Technologies, Ltd.. Intel Corporation, Version 1.0A, May 5, 1994, pp. 1–55.

"NetFRAME's New High–Availability Cluster Server Systems Avoid Scheduled as well as unscheduled Downtime", NetFRAME News Release, NetFRAME Systems Incorporated, pp. 1–3.

"NetFRAME ClusterServers", NetFRAME Systems Incorporated, 3/96, pp. 1–10.

IBM Technical Disclosure Bulletin, 35(2):69–74, Jul. 1992, "Serial Channel Synchronizer".

IBM Technical Disclosure Bulletin, 39(7): 229–230, Jul. 1996.

Sanchez et al., *Abstract* Camad '94, IEEE Workshop on Computer Aided Design and Modeling, p. 34, 1994, "Disnes: A Distributed Nertwork Emulation System for Gigabit Networks.".

Truong et al., *IEEE Communications Magazine,* pp. 70–85, May 1995, "LAN Emulation on an ATM Network.".

Cowart, Mastering Windows 3.1 Special Edition, pp. 119 and 814, Copyright by Sybex Inc., 1992.

Gavron & Moran, How to Use Microsoft Windows Nt 4 Workstation, pp. 27, 35, 38, 39, 41, 49, and 155, Copyright by Macmillian Computer Publishing USA, 1996.

\* cited by examiner

| ALERT/TYPE | Displayed Description |
|---|---|
| CPU | CPU identified by the CPU Number failed because of high temperature and/or low power. |
| SYSTEM BOARD FAN | The speed of the system board fan identified by the Cooling Fan Number has dropped below the minimum limit. |
| TEMPERATURE SENSOR | The temperature of the system board fan identified by the temperature sensor number has dropped below the minimum limit. |
| POWER SUPPLY | Power Supply identified by the Power Supply Number has been extracted or inserted or has gone into an abnormal state, please look into the Help file for more detail. |
| ADAPTER | The adapter identified by the Adapter Number or its driver is malfunctioning. |
| CANISTER | The Canister identified by the Canister Number has either been extracted or inserted. |
| SLOT FAN | The speed of the I/O slot fan identified by the Slot Fan Number has dropped below the minimum limit (slotFanMinSpeed). |
| CANISTER FAN | The speed of a fan in the canister identified by the Canister Number has dropped below the minimum limit. |

*FIG. 4B*

ALERT CONFIGURATOR AND MANAGER

RELATED APPLICATIONS

The subject matter of U.S. patent application entitled "Managing Computer System Alerts," filed on Oct. 1, 1997, application Ser. No. 08/943,356, now pending is related to this application.

PRIORITY CLAIM

The benefit under 35 U.S.C. § 119(e) of the following U.S. provisional application is hereby claimed:

| Title | Application No. | Filing Date |
|---|---|---|
| "High Performance Network Server System Management Interface" | 60/046,310 | May 13, 1997 |

APPENDICES

Appendix A, which forms a part of this disclosure, is a list of commonly owned copending U.S. patent applications or patents. Each one of the applications or patents listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to computer networks and their management systems. Specifically, the present invention relates to an apparatus for configuring, managing, or displaying the operating conditions in a computer network.

BACKGROUND OF THE INVENTION

SNMP Manager and SNMP Agent

Computer network management systems use a standardized communication protocol to facilitate communication between devices (computers, printers, peripherals) on the network The standardized communication protocol discussed with this invention is known as the Simple Network Management Protocol (SNMP). SNMP is explained in more detail in *The Simple Book* by Marshall T. Rose, 2d ed, Prentice-Hall Inc., 1994, which is hereby incorporated herein by reference. The SNMP acts as a mechanism to provide and transport management information between network components. SNMP is recognized as an industry standard for network management, Whenever a program at the user side sends a request to a program at the server site and waits for a response, the requesting program is called the 'client' and the responding program is called the 'server.' In network server management systems, the user (usually a network administrator) uses a software module known as a SNMP manager to monitor and manage the server or servers in a network. The SNMP manager sends commands to and receives information from a software module called a SNMP agent, which directly monitors and controls the server through device drivers and other components. The SNMP manager and the SNMP agent can be on the same work station, or the SNMP manager can be at a remote location.

SNMP uses a transport protocol stack such as User Datagram Protocol/Internet Protocol (UDP/IP) or Transmission Control Protocol/Internet Protocol (TCP/IP). UDP/IP provides connectionless communication over user Internet Protocol services. It is part of the TCP/IP suite. UDP/IP operates at the transport layer, and in contrast to TCP/IP, does not guarantee the delivery of data. TCP/IP is standard Internet protocol (or set of protocols) which specifies how two computers exchange data over tie Internet. TCP/IP handles issues such as packetzation, packet addressing handshaking and error correction. For more information on TCP/IP, see Volumes I, II and III of Comer and Stevens, Internetworking with TCP/IP, Prentice Hall, Inc., ISBNs 0-13-468505-9 (vol. I), 0-13-1255274 (vol. II), and 0-13474222-2 (vol. III).

Upon receiving a data request by a user, the SNMP manager opens one or more SNMP sessions and formulates a proper information request for SNMP agent. The SNMP manager is the 'client' and the SNMP agent is be 'server.' The SNMP manager may be generic or specifically designed for the particular server type.

Typically, the SNMP manager has several parts, each performing a diffident function. But these parts are related and work together to accomplish rain tasks. One of these tasks may be to display malfunctions and environment changes in the server.

Prior Inventions and Deficiencies

The SNMP agent may detect a malfunction or an environment change in the server and send a warning message to the SNMP manager. Some network server managers receive and display a warning message (an alert) associated wit every malfunction and environment change on the server that the agent detects. This allows the user to take further action if needed such as to shut the server down and replace components.

However, time is critical for many server manager applications. A network administrator may not need to be informed of all alerts generated by a server. Displaying every alert disrupts the network administrator's present task. This can be a major nuisance if the same alert is continuously sent by the SNMP agent for a minor environment change.

Displaying every alert also takes up valuable time for the network administrator to investigate what the alert is because the displayed alert may not be readily apparent to the user. For example, in some server management applications, au icon starts flashing at the top right band corner signifying an alert. The user clicks on the icon, pulls down a menu item or opens am object to view a description of the alert. Often, the description fails to inform the user of what the exact problem is or how to remedy the situation. The user then nee&s to then refer to a support manual or ask a more experienced user.

Furthermore, by sending, receiving, and displaying all alerts, the sever manager is taking up valuable bandwidth on the network. This increases the amount of traffic already on the network and decreases the performance of each computer. It also increases bottlenecking and system failures. A major goal in the computer network industry today is to reduce the amount and size of traffic on the network.

If there is more Than one server in the network, the problem is compounded Sending every malfunction and environment alert can overwhelm the system arid its network administrator.

For example, an airline or bank may have several servers where timing, number of transactions, and size of transactions are different for each server. An airline may use one server for managing ticket sales, one server to handle frequent flyer transactions, and another server to handle arriving flight information. Each server may have its own type of network components, response times, and backup systems capable of handling malfunctions or environment changes, One type of alert on the airline's server handling arrival times may demand immediate attention. On the other hand, the same type of alert generated by a server handling frequent flyer mileage may not require immediate attention.

SUMMARY OF THE INVENTION

The present invention provides an apparatus for monitoring alerts regarding the status of components in a computer. In one embodiment of the invention, this apparatus comprises at least one processor, which is configured to receive a plurality of alerts. These alerts may provide status information about different components in a computer. The apparatus may further comprise an alert module executing in the processor. The alert module may be configured to selectively disable the display of one or more of the status notifications. The alert module may be further configured to record status information associated with the disabled status notifications in a storage medium.

BRIEF DESCRIPTION OF THE DRAWINGS

These and other aspects, advantages, and novel features of the one embodiment of the invention will become apparent upon reading the following detailed description and upon reference to the accompanying drawings in which:

FIG. 4B lists the description of each alert type in one embodiment of the invention that appears in the alert manager window and the alert notification widow.

DETAILED DESCRIPTION OF THE INVENTION

Some alerts (also known as traps) regarding component malfunctions and environment changes in the server may have a higher priority than others because the network administrator (user) may need to take appropriate action immediately. These high priority alerts may be essential to avoid network disruption or further system damage. Other alerts have a lower priority, which do not require immediate attention. For these alerts, the network administrator may be able to postpone investigation or repair for a more convenient time. Sometimes, the alert may not need investigation at all.

One embodiment of the invention allows the network administrator to configure, manage, and display certain alerts for a network server or a umber of network servers. Specifically, the network administrator can enable or disable one or more future alert notifications.

For example, a typical alert may occur when a temperature sensor in the server rises above a predetermined level. If the network administrator does not wish to view temperature alerts, he or she can delete or disable all future notifications of temperature alerts. The network administrator can also enable future temperature alerts for one server and disable it for all other servers, or any combination the administrator chooses.

Figure 1:
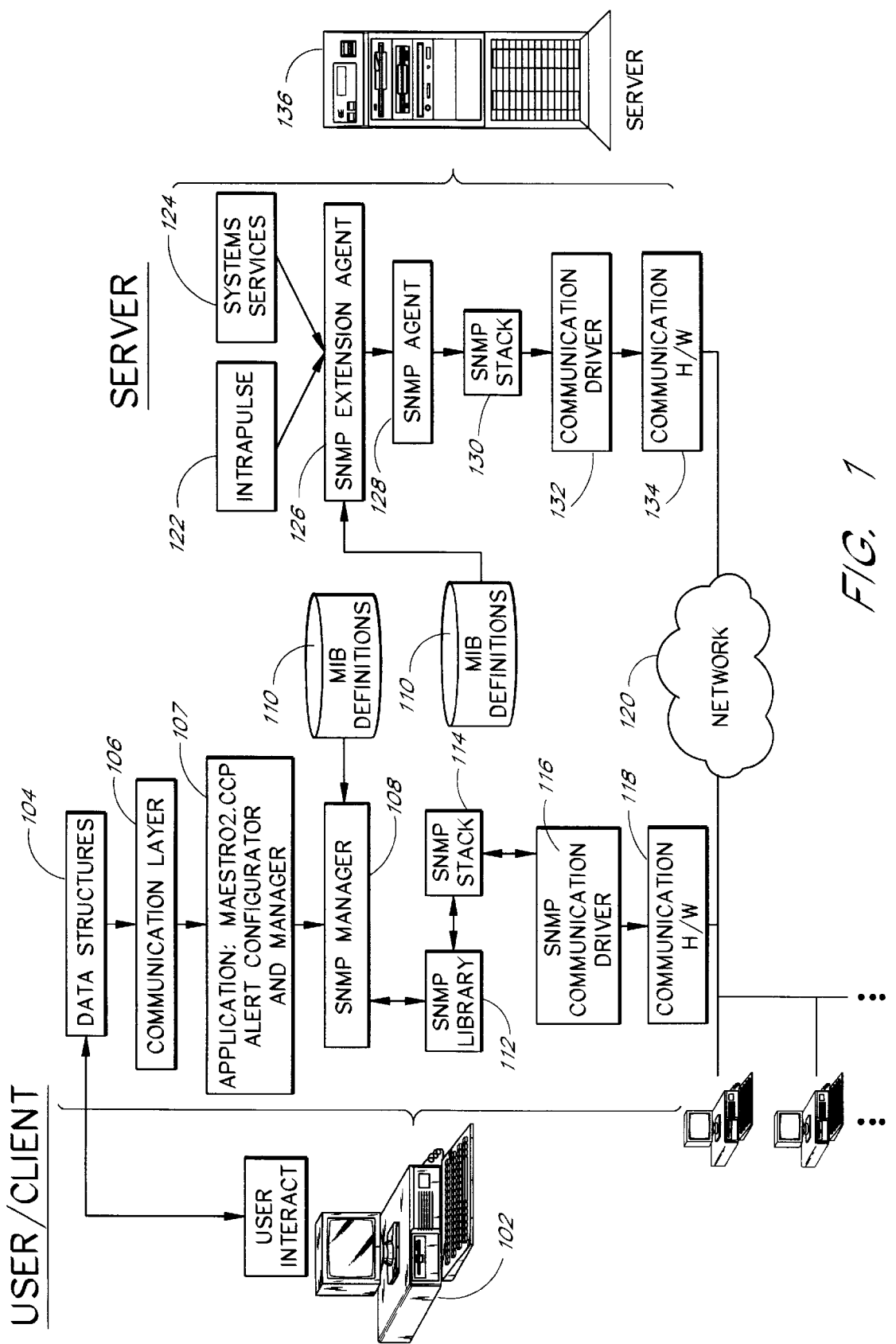
FIG. 1 illustrates a high level architectural overview of a network server management system in accordance with one embodiment of the invention

One embodiment of the invention also creates an entry in a log file of each component malfunction or environment change detected in the server. This log file may be stored in a storage medium such as the computer memory which may include random access memory, volatile memory, nonvolatile memory, a hard disk, magnetic memory, optical memory, CD ROM, digital versatile disks and the like. Each log entry may contain the number of the alert , the date of be alert, the time of the alert, the source of the alert, the category of alert, a description of the alert, and details of the alert. The details may contain a recommended course of action for tie user. One embodiment of the invention can create these log entries even if the user has disabled the display of the alert. Thus, the user can view the alert log file and keep track of each type of alert and when they occurred.
Architectural Overview FIG. 1 illustrates a high level architectural overview of a network server management system in accordance with one embodiment of the invention. In one embodiment of the present invention, the alert configurator and manage, hereinafter alert configurator; application is contained in a software module called Maestro Central 107 manufactured by NetFRAME Systems Incorporated of Milpitas, Calif. Maestro Central 107 may be used in a Microsoft Windows environment. Maestro Central 107 sends instructions to the SNMP manager 108.

In one embodiment of the invention, the client and server computers 102 and 136 are on multi-processor Pentium Pro-based computers having 256 megabytes or more of RAM. It will be apparent to those of ordinary skill in the art, however, that the computers 102 and 136 may be any conventional general purpose single- or multi-chip microprocessor such as a Pentium processor, a Pentium Pro processor, a 8051 processor; a MIPS processor, a Power PC processor, an ALPHA processor, etc. In addition, the computers 102 and 136 may be any conventional special purpose microprocessor such as a digital signal processor or a graphics processor.

At the user (or client) side, the SNMP manager 108 displays data to the user through a communication layer that organizes the data into data structures. The display device at the user station 102 in FIG. 1 may be liquid crystal device, cathode ray tube (CRT) or other suitable display device. When the SNMP manager 108 receives a command from the user, it calls a standard Windows SNMP Library of objects 112, which sends messages using an SNMP protocol stack 114, such as UDP/IP, to the SNMP agent 128 via a network of drivers 116, adapters 118, and network medium 120.

At the server side, the SNMP agent 128 retrieves information regarding malfunctions or certain environment conditions detected in the server 136. If there is more than one server in the network, then there is preferably an SNMP agent 128 associated with each server.

In one embodiment of the present invention, the server 136 is an NF9008 (also known as NF9000-T) manufactured by NetFRAME Systems Incorporated of Milpitas, Calif. The NF9008 series are fault-tolerant, standards-based servers, which have multiple peripheral component interconnect (PCI) card slots for one or more adapters. In another embodiment of the present invention, the server 136 is an NF9016 (also known as an NF9000-C), which has multiple canisters or fault isolation units (FIU). These canisters are boxes which may each contain more tan one PCI adaptor card slots. Multiple card slots and multiple canisters allow the user to remove or add adapters to the server while the server and operating system continue to run In one embodiment of the present invention, the SNMP agent 128 retrieves information from device drivers 124 and a self-contained network of distributed service microprocessors called Intrapulse 122. Intrapulse 122 is manufactured by NetFRAME Systems Incorporated of Milpitas, Calif. This self-contained network continuously monitors and manages the physical environment of the server, regardless of the operation status of the server (a component of the server may be malfunctioning). Malfunctions and environment conditions may include temperature, fan speed, voltage levels, and power supplies. The SNMP agent 128 also sends messages to the SNMP manager 108 via a network of drivers 132, adapters 134, and network medium 120.

Overview of Module-level structure and Description of Modules

An 'object' as used here and in object-oriented programming is a variable that may comprise both routines (methods) and data. An object is treated as a discrete entity and may have its own address. Some objects, may only contain data and no routines.

An 'alert' as used in this description refers to the definition and description of status messages, the format of status messages, the content of status messages, the generated status messages, the received stats messages, and the operational properties of rent components.

A 'class' as used here is a blueprint of an object From a class with specified properties, methods, and functions, the application can create objects with those same properties, methods, and functions. Once the object is created, the application can modify the properties of the object and the data in the object. An application can use multiple objects of the same class. A class may also be used to describe a group of objects sharing the same properties, etc.

Objects and classes are explained in more detail in Object Programming with Visual Basic4 by Joel P. Deblin and Matthew J. Curland, Microsoft Press, 1996, and Computer Dictionary by collective authors, Microsoft Press, 1991, which are incorporated in its entirety by reference In the following description of one embodiment of the invention, a 'module' includes, but is not limited to, software or hardware components which perform certain tasks. Thus, a module may include object-oriented software components, class components, procedures, subroutines, data structures, segments of program code, drivers, firmware, micro code, circuitry, data, data structures, tables, arrays, etc. In addition, those wit ordinary skill in the art will recognize that a module can be implemented using a wide variety of different software and hardware techniques. A module may also mean a published report by a group of experts defining Management Information Base (MIB) objects for a particular area of technology. RFC 1213, *Management Information Base for Network Management of TCP/IP-based Internets: MIB*-II, contains a module defining the basic objects needed to manage a TCP-IP network.

Figure 2:
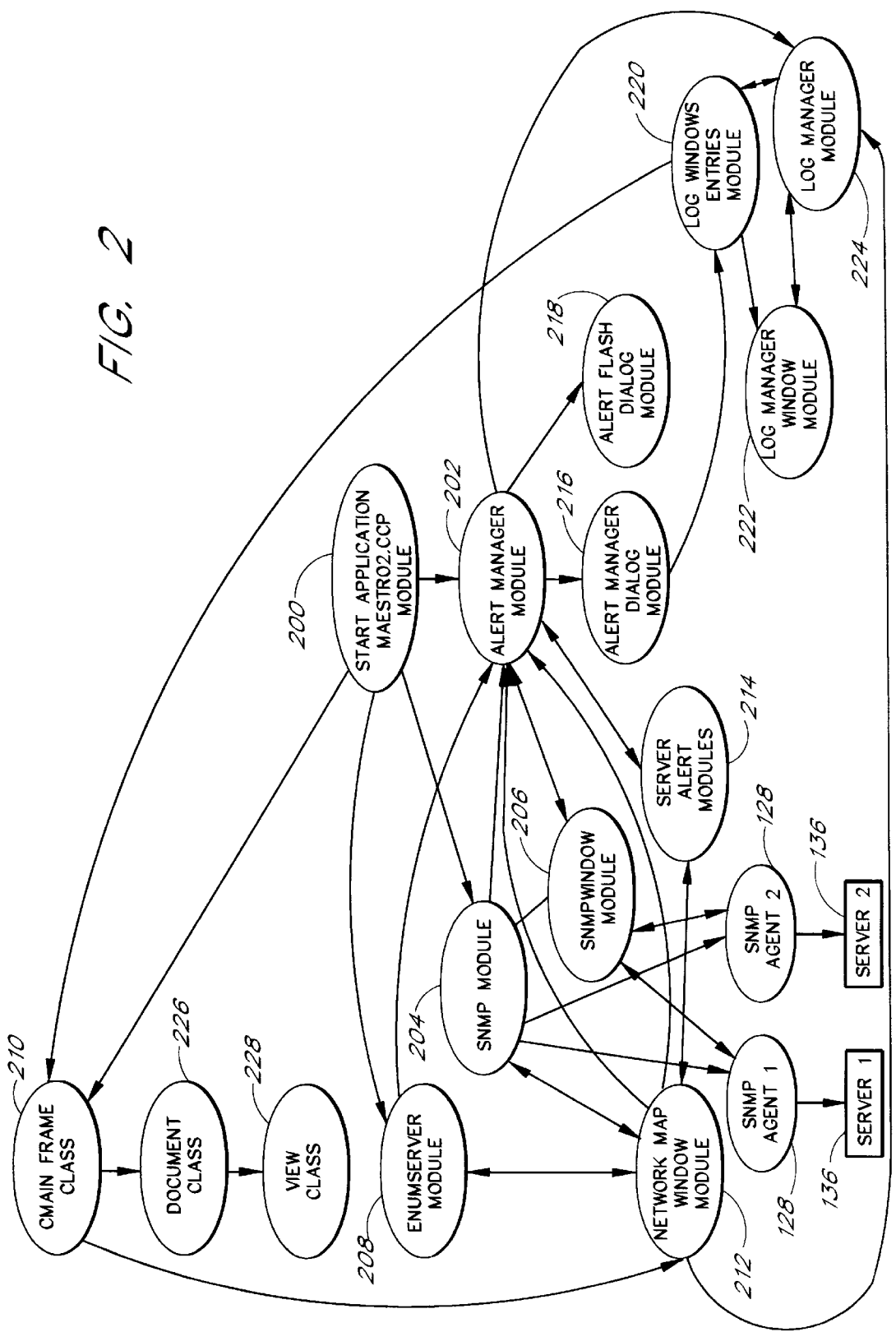
FIG. 2 illustrates a module-level architecture in accordance with one embodiment of the invention.

FIG. 2 illustrates a module-level architecture in accordance with one embodiment of the invention. The "start application" block 200 is the first step where all modules and dialog boxes used for one embodiment the present invention are created. In one embodiment of the invention, this application is a C++ class file called "maestro2.ccp."

The CMain Frame Class 210 creates all the windows and graphical user interfaces used in one embodiment of the preset invention. This is also known as the Microsoft Foundation Class (MFC) Document/View Architecture. The Document Class 226 stores the data about the application in data structures. The View Class 223 displays to the user a representation of the data kept in the Document class which are defined by Microsoft Corporation. The use of these classes is explained in more detail in Inside OLE, 2d edition, 1995 by Kraig Brockschmidt (p. 720, 814), which is hereby incorporated herein in its entirety by reference.

Figure 3:
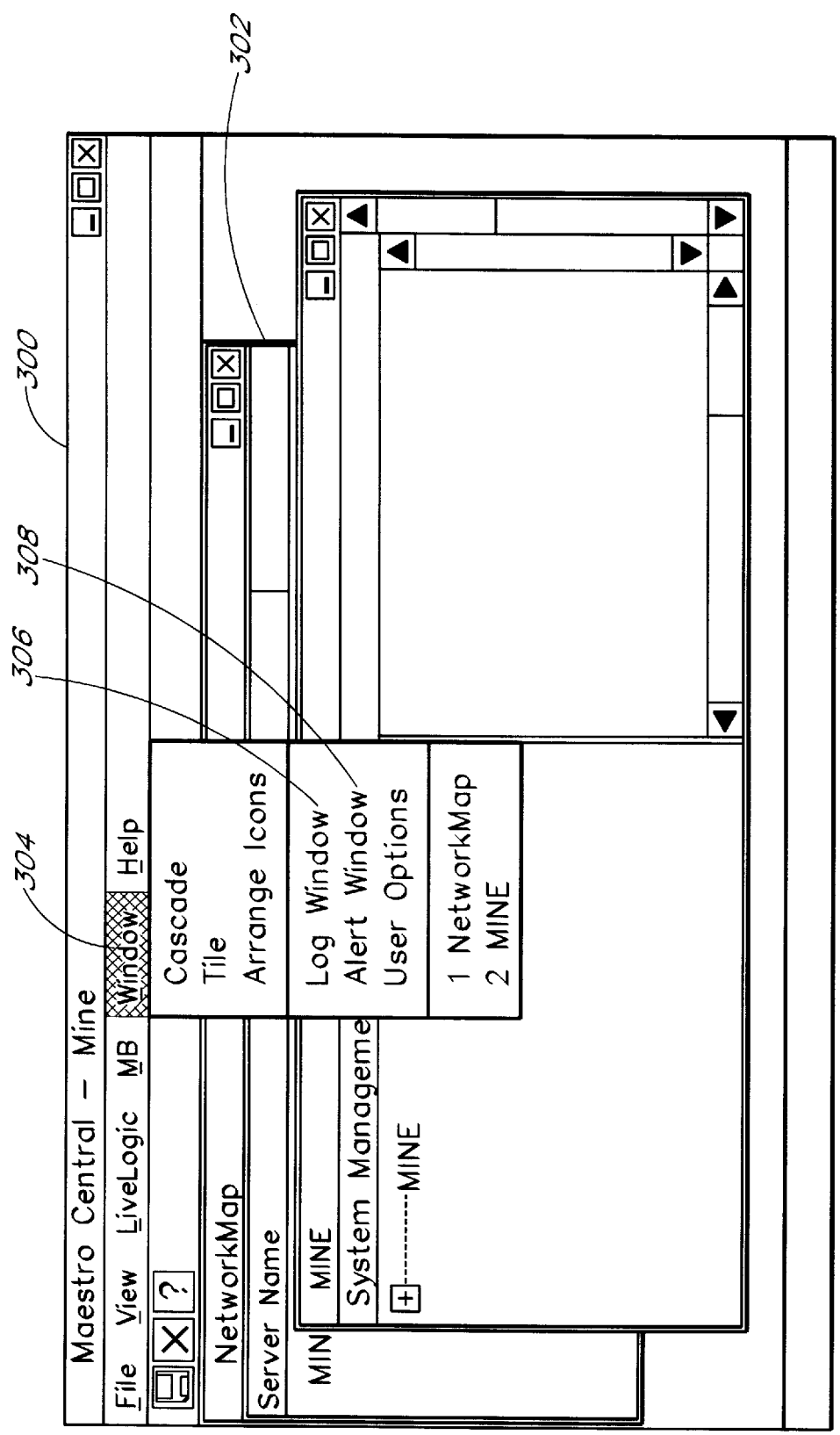
FIG. 3 illustrates the window where the user may access the alert manager in a server manager system in one embodiment of the claimed invention.

The Network Map Window Module 212 may perform a number of functions in addition to displaying the Network Map Window 302 as shown in FIG. 3. The Network Map Window Module 212 may also display each server 136 in the network as an icon in the Network Map Window 302, display each server in the Alert Manager Window 400 (FIG. 4A), and create a list of alerts for each server 136. The Network Map Window Module 212 may call the EnumServer Module 208 to discover the names and number of servers in the network The Network Map Window Module 212 may also call the SNMP Module 204 to obtain the list of servers and their alerts in the Alert Manager Table 1002 FIG. 10) of the Alert Manager Module 202. This list of alerts is called a Sewer Alert Module 1004. Each server 136 has a Server Alert Module 1004. If there is more than one server 136, then there is more m one Server Alert Module 1004 in the Alert Manager Table 1002.

The EnumServer Module 208 stores information, in the memory of the microprocessor 102. The EnumServer Module 208 is preferably a local module, but it is global in the sense that it is accessible from anywhere in the system This EnumServer Module 208 identifies the number of servers in the system For example, if there are multiple servers, the EnumServer Module 208 acts as a repository of server informational The SNMP Module 204 is a class that encapsulates all the SNMP functions used by one embodiment of the present invention, such as "GET," "GET NEXT," and "SET." The GET function is typically used by the SNMP agent 128 to retrieve non-table SNMP MIB data from the server 136 in response to a request by the SNMP manager 108. The GET NEXT function is used to retrieve more than one MIB variable, such as a table of variables. Often, a loop is created with GET NEXT until all values are retrieved. The SET function is used by the SNMP agent 128 to change The value of a MIB variable.

In general, a MIB defines the aspects of a system and/or components in the system, such as a disk drive or a memory module. The MIB may contain numeric identifiers which tell system components how to access each variable. In one embodiment of the invention, the MIB 110 contains a hierarchical collection of variables related to the hardware and software components of the server. Using the MIB variables, the SNMP manager 108 (more specially, the SNMP Module 204) creates an information request which is sent to the SNMP agent 128.

MIB variables we known by those with skill in the art. For example, U.S. Pat. No. 5,471,617 entitled COMPUTER MANAGEMENT SYSTEM AND ASSOCIATED MANAGEMENT INFORMATION BASE issued to Farrand et al. which is hereby incorporated herein in its entirety, describes the operation of a basic MIB in detail.

The SNMP Module 204 also receives alerts from the server 136. The SNMP Module 204 passes this information to the Alert Manager Module 202 via the SNMP Window Module 206.

The SNMP Window Module 206 is used to pass messages among applications. The SNMP Window Module 206 allows an application, such as an alert configurator, to communicate with the SNMP itself The use and operation of an SNMP Window Module 206 is well known to those of ordinary skill in the art.

Figure 10:
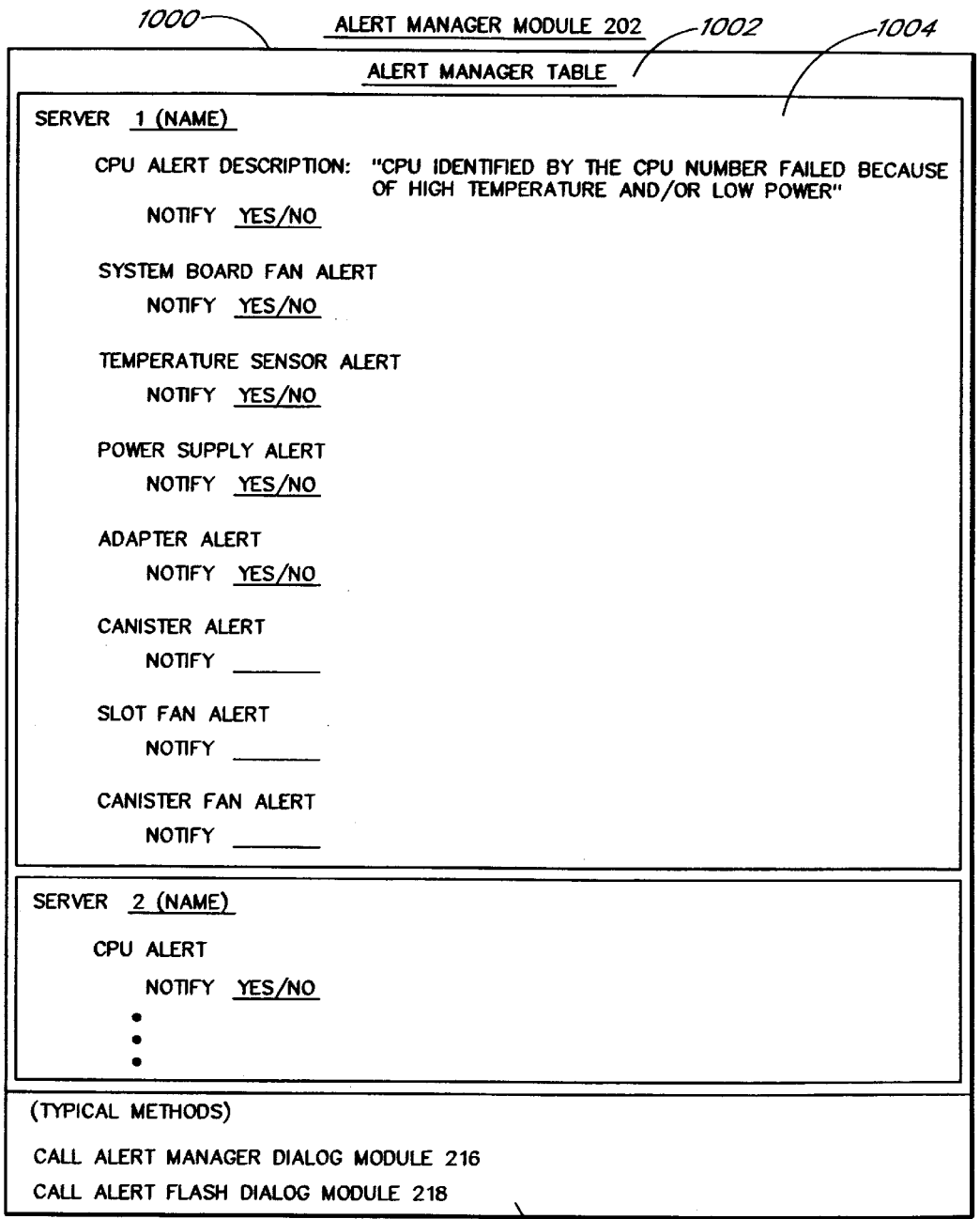
FIG. 10 illustrates the contents of the Alert Manager Module in one embodiment of the invention.

The Alert Manager Module 202 performs a number of functions: it creates the alert types, registers the alert types for each server in the network, stores information regarding each server's user-selected alerts in an Alert Manager Table 1002 shown in FIG. 10, and temporarily stores the data related to an incoming alert. This data related to an incoming alert may be displayed in an alert notification window and/or sent to a log file. In one embodiment of the invention, the alert notification window is called the Alert Notification window 500, and the log file is managed by a Log Manager module 224 and a Log Window Entries Module 220.

Figure 6:
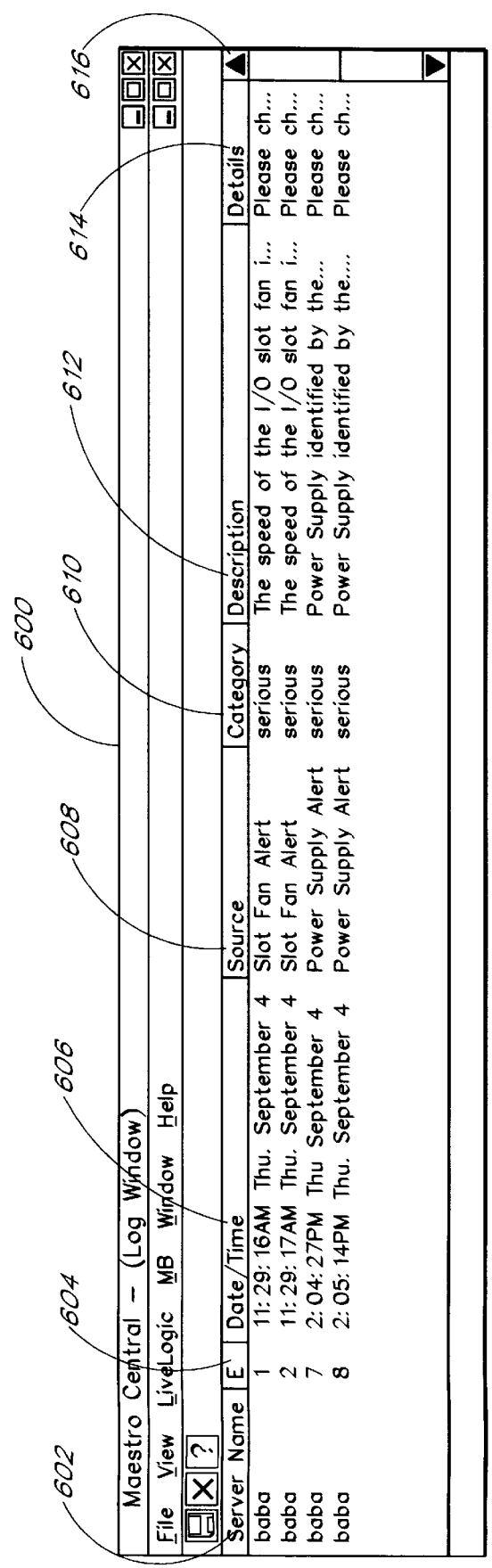
FIG. 6 illustrates one embodiment of a log window.

The Log Window Entries Module 220 receives information about each detected alert from the Alert Manager Module 202 and adds the entries to a table in the Log Manager Module 224. The Log Manager Module 224 keeps a list of Log Window Modules, which are entries to be shown in the Log Window 600 (FIG. 6). The Log Manager Module 224 uses a Log Manager Window Module 222 to display thee list of alert entries which may include server name, alert type, the time and date of the alert, their descriptions, and details.

Start Application

Figure 7:
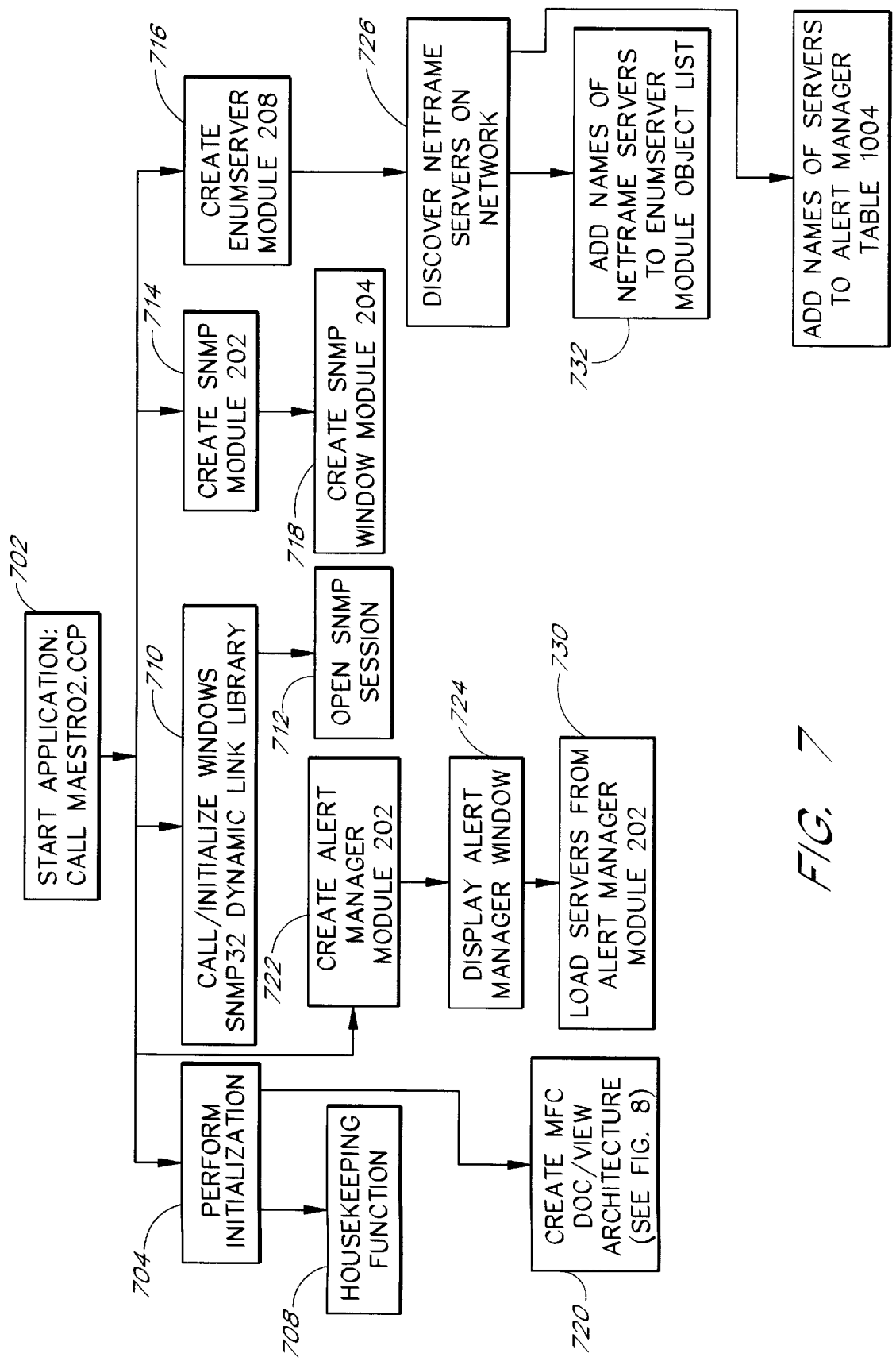
FIG. 7 illustrates the sequence of acts that may occur when the user starts the an application in one embodiment of the present invention

FIG. 7 shows the start application process in one embodiment of the present invention. In FIG. 7, the alert configurator and manager can be accessed after the user starts an application called "maestro2.ccp" (herein referred to as "Maestro" 200) a C++ class file, as shown in block 702.

Maestro 200 calls standard Microsoft initialization modules in a block 704 to perform standard housekeeping functions in a block 708. In a block 710 Maestro 200 also calls or initializes a standard dynamic link library (DLL) such as the Windows SNMP (WinSNMP) DLL (WinSNMP Library) manufactured by American Computer Electronic Corporation. The WinSNMP Library is used to do SNMP transactions while the application Maestro is running. DLLs execute under the Microsoft Windows NT or Windows 95 operating systems.

Maestro 200 also creates (1) a Microsoft Foundation Class Document/View Architecture MFC Doc/View Architecture) 210 shown in block 720; (2) an SNMP Module 204 shown in block 714; (3) an EnumServer Module 208 shown in block 716; and (4) an Alert Manager Module 202 shown m block 722. Each of these modules are flirter explained in detail below.

Figure 8:
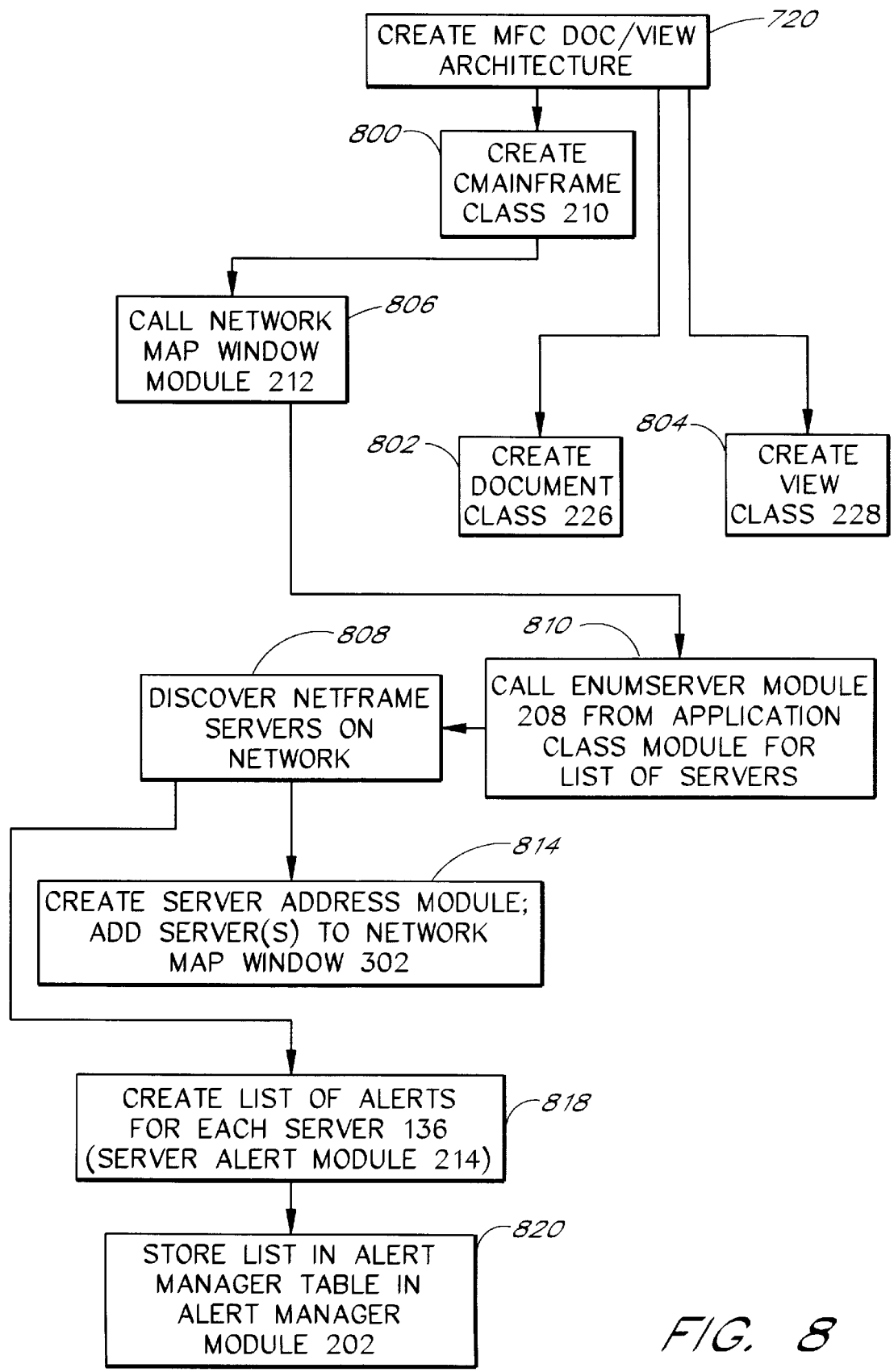
FIG. 8 illustrates one module-level process of how the network map window is created in one embodiment of the preset invention.

The MFC Doc/View Architecture shown in block 720 creates all the windows and graphical user interfaces used in one embodiment of the present invention. This is illustrated in FIG. 8. Specifically, the WinSNMP Library creates the CMain Frame Class 210, the Document Class 226, and the View Class 228 in blocks 800, 802, and 804. As described above, the Document Class 226 keeps the data about the application, and the View Class 228 displays to the user a representation of the data kept in the Document Class 226. The Main Frame Class 210 creates the Alert Manager Window 400 the Alert notification Window 500, and the Log Window 600.

As shown in block 806, the CMainFrame Class 210 also calls the Network Map Window Module 212 to display the Network Map Window 302. The Network Map Window Module 212 calls the EnumServer Module 208 in a block 810 to discover the number of servers in the network and the names of each server 136 in a block 808. The EnumServer Module 208 then adds a server icon and server name to the Network Map Window 302 for each server 136 found in a block 814. The EnumServer Module 208 also adds the names of the servers found in a block 814 to the Alert Manager Table 1004 inside the Alert Manager Module 202 in blocks 818–820.

For each server 136 found, the Network Map Window Module 212 calls the Alert Manager Module 202 to create and store a list of each sewer's alerts in the Alert Manager Table 1002 of the Alert Manager Module 202. This is shown in blocks 818 and 820. For each alert, there is a textual description detail, and notift/do not notify status. This list of alerts for each server is called a Server Alert Module 214. Each server preferably has its own Server Alert Module 214. The Server Alert Modules 214 are stored within the Alert Manager Table 1002 FIG. 10) which is stored within the Alert Manager Module 202. In other words, if there are two servers, the Alert Manager Table 1002 contains two Server Alert Modules 214.

The Maestro 200 also creates the SNMP Module 204 in block 714. And the SNMP Module 204 creates the SNAP Window Module 206 as shown in block 718. In one embodiment of the invention, the SNMP Window Module 206 interacts with the WinSNMP Library to pass messages between applications. Tie WinSNMP Library uses a window while transacting SNMP operations. The Maestro application may use a hidden window which is not visible on the user's desktop while the application is running. The SNMP Window Module 206 allows an application, such as an alert configurator, to communicate with the SNMP itself.

Maestro 200 also creates the EnumServer Module 208 shown in block 716. The EnumServer Module 208 is empty at Ibis point, but it is made global for future access from anywhere in the system. When the application is running, there may be cain information that is constantly extrapolated by different par of the system. For example, there may be multiple savers that use the same or similar data. This information is stored locally in a central locating such as the EnumServer Module 208. It acts as a repository. In one embodiment of the present invention, the EnumServer Module 208 discovers the names and number of NetFRAME servers on the network and stores this information in an EnumServer Module list as shown in blocks 726 and 732. The EnumServer Module 208 may also add the names of the servers found to the Alert Manager Table 1004 (FIG. 10).

Figure 4A:
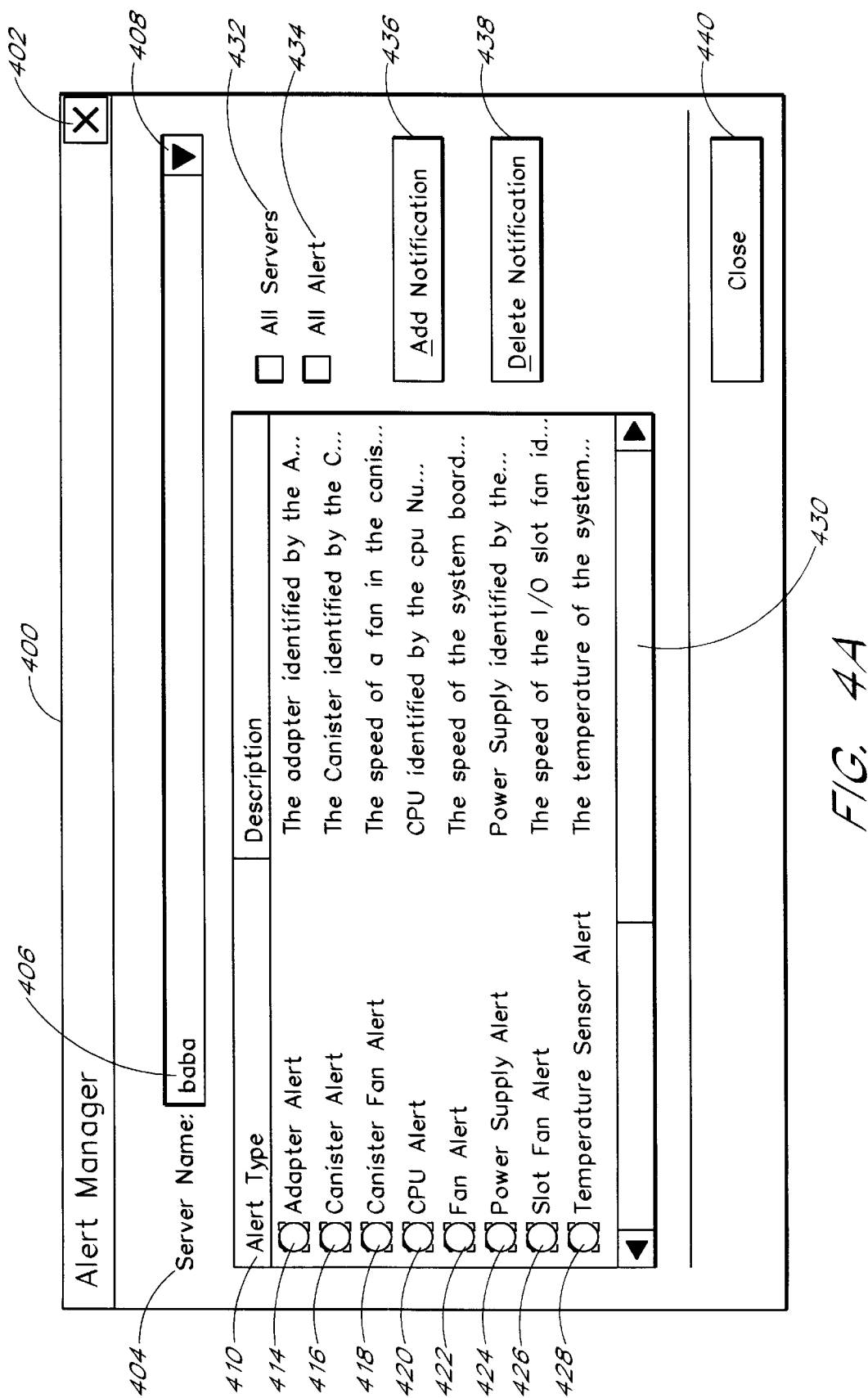
FIG. 4A illustrates one embodiment of the alert manager window.
Figure 5:
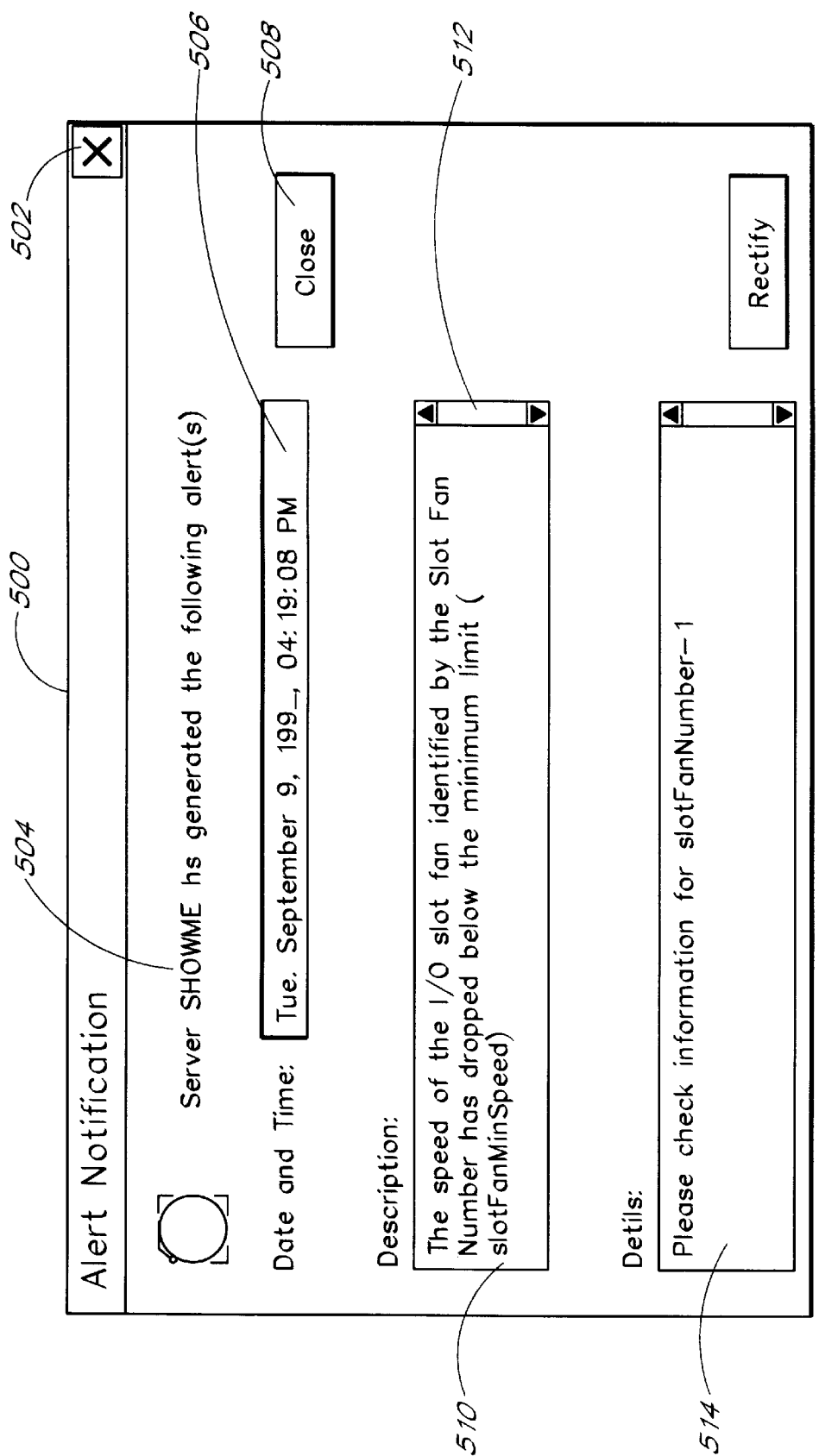
FIG. 5 illustrates one embodiment of an alert notification window when an alert is received by the server manager.

Maestro 200 also creates the Alert Manager Module 202 as shown in block 722. The Alert Manager Module 202 performs a number of actions it creates the alert types, registers the alert types for each server 136 in tie network; stores information regarding each server's user-selected alerts in au Alert Manager Table 1002 shown in FIG. 10; calls the Alert Manager Dialog Module 216 to display the Alert Manager Window 400 (FIG. 4A) and loads information regarding each server and its alerts as shown in block 724 and block 730; temporarily stores the data related to an incoming alert; and calls the Alert Flash Dialog Module 218 to display an alert notification (FIG. 5). The Alert Manager Table 1002 keeps track of (1) the names of each server 136, (2) the alerts associated with each server 136, and (3) the notify/do not notify status of each alert for each server 136.

After the user starts the Maestro application 200, the user can access the alert configurator and manager software application from the Network Map Window 302 in FIG. 3. The user clicks and pulls down the "Window" menu 304 and selects the "Alert Window" item 308. When "Alert window" 308 is selected, the SNMP manager 108 displays an "Alert Manager" Window 400 as shown in FIG. 4A

Alert Types in One Embodiment of the Invention

In one embodiment of the present invention, there are eight alert types that may be generated by an SNMP agent 128 in connection with a fault-tolerant server such as the NetFRAME NF9000. These eight alerts are defined in the NF9000 server's customized MIB 110 (FIG. 1). It will be apparent to those of ordinary skill in the art, however, that other alerts related to a server may be used in a server management system In one embodiment of the present invention, the first alert type is identified by the MIB variable "trapCpu" and assigned &e identifier 1.3.6.1.4.1.837,2.1.1 in the serve's MIB 110. This alert type reports tie number of a CPU (cpuNumber) that failed because of high temperature and/or low power When trapCpu is sent from the SNMP agent 128 to the SNMP manager 108, the information stored in the trapCpu variable itself is actually the value of the MIB variable "cpuNumber for that particular CPU. The MIB variable cpuNumber is used here to identify the number of the CPU that failed.

For example for CPU number 2 in the server, the value of variable "cpuNumber" is equal to 2. When CPU number 2 fails, the SNMP agent 128 sends a "trapCpu" message to the SNMP manager log. Within that "trapCpu" variable is the value of the "cpuNumber" which is equal to 2. This number mu be used by the SNMP Module 204 to index a cpuTable and retrieve more information on the failed CPU.

The second alert type is identified by the MIB variable "trapSystenBoardFan" and assigned the identifier 1.3.6.1.4.1.8372.1.2 in the serve's MIB 110. This alert type reports the number of a filed system board fain (coolingFanNumber). A fan 'fails' when the speed of that fan drops below a predetermine minimum speed in the MIB variable "coolingfanMinSpeed." This variable can be set/modified by the user. When trapSystemBoardFan is sent from the SNMP agent 128 to the SNMP manager 108, the information stored in the trapSystemBoardFan variable itself is actually the value of the MIB variable "coolingFan-Number" for that particular fan. The MIB variable cooling-FanNumber is used here to identify the number of the fan that failed his number can be used by the SNMP Module 204 to index a coolingFanTable and retrieve more information on the failed fan.

The third alert type is identified by the MIB variable "trapTemperature" and assigned the identifier 1.3.6.1.4.1.837.2.1.3 in the server's MIB 110 This alert type reports the number of a temperature sensor (coolingSensorNumber) that detected a "normal" to "warning" transition. More specifically, the temperature sensor detected a temperature above the warning level defined by the MIB variable "coolingAlertTemperature." This variable can be set/modified by the user. When trapTemperature is sent from the SNMP agent 128 to the SNMP manager 108, the information stored in the trapTemperature variable itself is actually the value of the MIB variable coolingSensor-Number for that particular temperature sensor. The MIB variable coolingSensorNumber is used here to identify the number of the temperature sensor that detected a temperature above the "warning" level This number can be used by the SNMP Module 204 to index a coolingTemperatureSensorTable and retrieve more information on the temperature sensor.

The fourth alert type is identified by the MIB variable "trapPowerSupply" and assigned the identifier 1.3.6.1.4.1.837.2.1.4 in the server's MIB 110. This alert type reports the number of a power supply (powerSupplyNumber) that has detected one of four possible conditions: (1) power supply has bee extracted, (2) power supply has been inserted; (3) an AC failure meaning the AC state of the power supply is out of tolerance range; or (4) a DC failure meaning the DC state of the power supply is out of tolerance range. In one embodiment of the invention, the serve is a NF9008. For an NF9008, AC state information and insertion/extraction events are not available, but a change in DC state may indicate a failure or power supply insertion/extraction When trapPowerSupply is sent from the SNMP agent 128 to the SNMP manager 108, the information stored in he trapPowerSupply variable itself is actually the value of the MIB variable "powerSupplyNumber" for that particular power supply. The MIB variable powerSupplyNumber is used here to identify the number of the power supply that failed. This number can be used by the SNMP Module 204 to index a powerSupplyTable and retrieve more information on the power supply.

The fifth alert type is identified by the MIB variable "trapCanister" and assigned the identifier 1.3.6.1.4.1837.2.1.5 in the server's MIB 110. This alert type reports the name of the canister (canisterName) that has been extracted or inserted. This alert type is not available for the NF9008 because the NF9008 does not have any canisters. When trapCanister is sent from the SNMP agent 128 to the SNMP manager 108, the information stored in the trapCanister variable itself is actually the value of the MIB variable "canisterName" for that particular canister. The MIB variable canisterName is used here to identify the name of the canister that has been extracted or inserted. This name can be used by the SNMP Module 204 to index a canister-Table and retrieve more information on the extracted/inserted canister.

The sixth alert type is identified by the variable "trap-Adapter" and assigned the identifier 13.6.1.4.1.837.2.1.6 in the server's MIB 110. This alert type reports the number of an adapter (adapterName) or its driver than malfunctioned. When trapAdapter is sent from the SNMP agent 128 to the SNMP manager 108, the information stored in the trap-Adapter variable itself is actually the value of the variable "adapterNumber" for that particular adapter. The MIB variable adapterNumber is used here to identify the number of the adapter or its driver that failed. This number can be used by the SNMP Module 204 to index an adapterTable and retrieve more information on the failed adapter or its driver.

The seventh alert type is identified by the variable "trapSlotFan" and assigned the identifier 1.3.6.1.4.1.837.2.1.7 in the server's MIB 110. This alert type reports the number of an I/O slot fan (slotFanNumber) that failed. A fan 'fails' when the speed of that fan drops below a predetermined minimum speed in the MM variable "slotFanMinSpeed." This variable can be set/modified by the user. When trapSlotFan is sent from the SNMP agent 128 to the SNMP manager 108, the information stored in the trapSlotFan variable itself is actually the value of the variable "slotFanNumber" for that particular slot fan. The MIB variable slotFanNumber is used here to identify the number of the slot fan tat failed. This number can be used by the SNMP Module 204 to index a slotFanTable and retrieve more information on the failed fan.

The eighth alert type is identified byte variable 'tapCanisterFan" and assigned the identifier 1.3.6.1.4.1.837.2.1.8 in the server's MIB 110. This alert type reports the name of the canister (canisterName) which has at least one fan operating below a predetermined minimum limit allowed. This predetermined minimum speed is defined by the MIB variable "canisterFanMinSpeed." This variable can be set/modified by the user. When trapCanisterFan is sent from the SNMP agent 128 to the SNMP manager 108, the information stored in the trapCanisterFan variable itself is actually the value of the variable "canisterNumber" for that particular canister. The MIB variable canisterNumber identifies the name of the canister with at least one failed fan. This name can be used by the SNMP Module 204 to index a canisterTable and retrieve more information on the failed fan.

The alert types are displayed in the Alert Manager Window 400 shown in FIG. 4A. After each alert type, there is a brief description 412 of the alert type. The descriptions are listed in FIG. 4B. In one embodiment of the invention, the text associated with each type of alert is hardcoded in the application itself, such as Maestro Central 107.

Adding/Deleting One or More Alert Notifications

Figure 9:
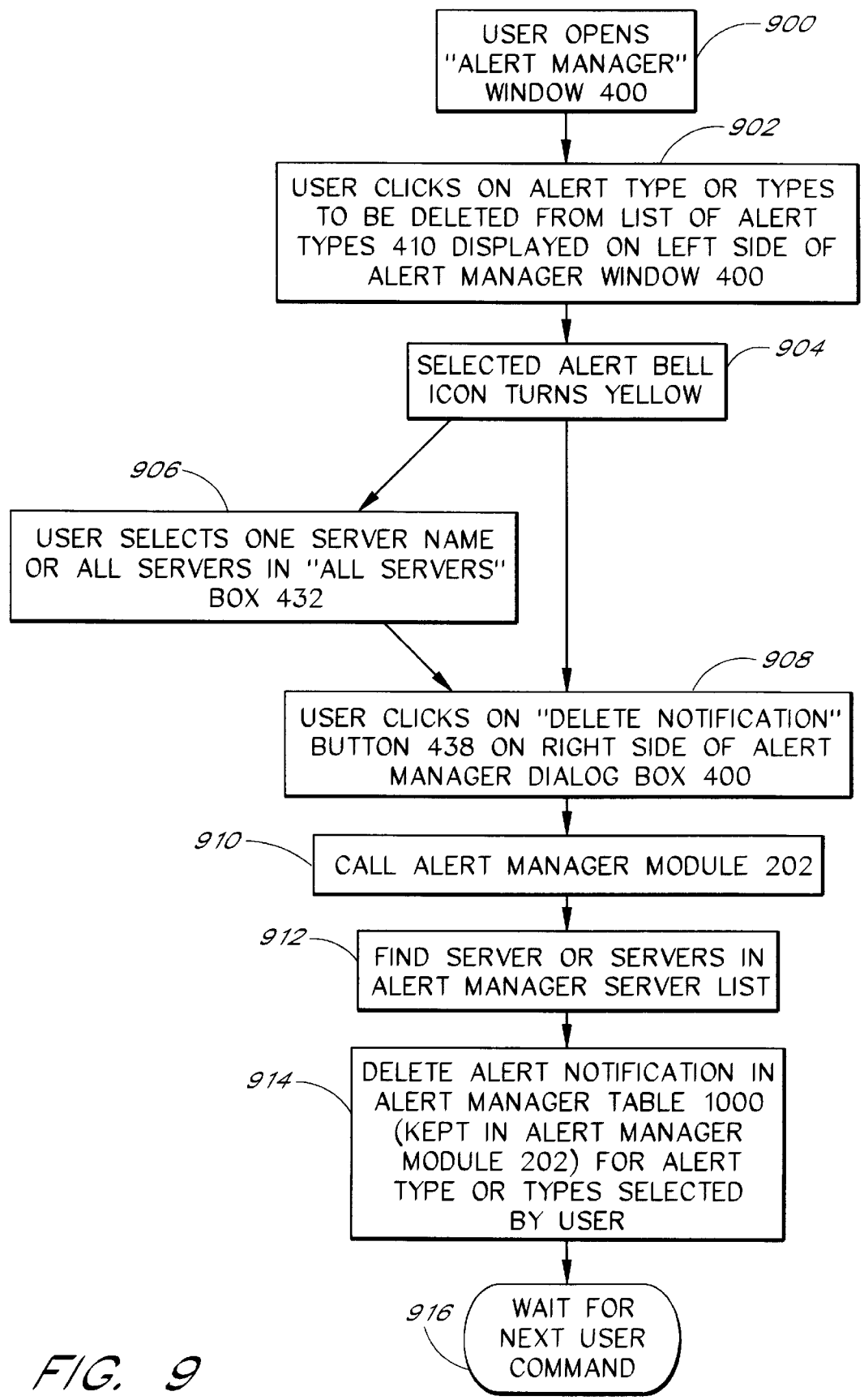
FIG. 9 illustrates one sequence of acts that occur when the user configures a list of alerts or deletes an alert for a particular server(s).

FIG. 9 shows the process for deleting or disabling one or more alert notifications for one or more servers. The process for adding an alert notification is similar to the process shown in FIG. 9. In a block 900 of FIG. 9, the user can open the Alert Manager Window 400 by clicking and pulling down the "window" menu 304 and selecting the "Alert Window" item 308 FIG. 3). When "Alert Window" 308 is selected, the SNMP manager 108 calls the Alert Manager Dialog Module 216 (FIG. 2) and displays an "Alert Manager" Window 400 as shown in FIG. 4A.

In one embodiment of the present invention, the default mode for the SNMP manager 108 is to receive and display/ notify the user of all alerts received from all servers. To change the default mode, the user may delete the alert notification for one or more alerts and for one or more servers. This can be done from the Alert Manager Window 400 shown in FIG. 4A. In a block 902, the user can select certain alert types to be deleted by clicking on the alert bell icon 414–428 (FIG. 4A) to the left of each alert type. For example, the user can delete the Adapter Alert 414 and the Canister Alert 416 notifications for one server and delete the CPU Alert 418, the Fan Alert 422, and the Temperature Sensor Alert 429 notifications for another server. In other words, each server can have its own user-configured list of alerts.

When the Alert Manager Window 400 is first displayed, all alert types 410 are listed on the left side with a red bell icon 414 trough 428 in one embodiment of the present invention. As shown in block 904, if the user clicks on any of the red bell icons associated with an alert type, that bell icon becomes yellow. For example, if the user wants to delete the Cater Alert 416 notification, the user would click on the red bell next to the Canister Alert 416. The red bell next to Canister Alert 416 turns yellow.

But in one embodiment the alert notification is not deleted immediately; the notification deletion preferably only occurs after the user clicks on the "Delete Notification" button 438 on the right side of the Alert Manager Window 400. Before the user clicks on the "Delete Notification" button 438, the user can click on other alert types to be deleted. After the user finishes selecting all the alert notifications to be deleted, the user clicks on the "Delete Notification" button 438. All alert notifications to be deleted are deleted together. Thus, the user can delete more than one alert notifications for one or all servers with a single command. This is shown in block 906. When the user is finished selecting alert yes, the user clicks on the "Delete Notification" button 438 as shown in block 908. In blocks 910–912, the Alert Manager Dialog Module 216 calls the Alert Manager Module 202 FIG. 2), which finds the servers or servers selected by the user in the Alert Manager Server List. In blocks 914–916, the Alert Manager Module 202 deletes alert notification for the alerts designated by the user in the Alert Manager Table 1000 (FIG. 10) and waits for the next user command.

The process is similar for adding one or more alert notifications for one or more servers. The process described above and shown in FIG. 9 is the same except the bell icon 414 through 428 turns from yellow to red, and the user clicks on the "Add Notification" button 436 instead of the "Delete Notification" button 438.

One embodiment of the present invention also allows the user to add or delete alert notifications for more than one server without reopening the Alert Manager Window 400. After the user selects the alert types to be deleted and clicks on the "Delete Notification" button 438, the Alert Manager Window 400 remains open on the users desktop. The user can then go to the Server Name box 406 and view a list of servers in the network by clicking and pulling down the scroll-down button 408. The user can then select another server name from the list of servers. The name of this server appears in the Server Name box 406 and the Alert Manager Window 400 displays the, alert configuration for this particular server. The user can then add or delete alert notifications for This second server following the steps shown in FIG. 9 and described above. Thus, each server in the network can have its own user-configured list of alerts.

In addition, one embodiment of the present invention allows the user to add or delete one or more alert notifications for all servers at once by clicking in the "All Servers" box 432 and clicking on the "Add Notification" button 436 or the "Delete Notification" button 438. Similarly, the user can add or delete all alert notifications for one or more servers by clicking on the "All Alerts" box 434 and clicking on the "Add Notification" button 436 or the "Delete Notification" button 438.

After the user fishes configuring the server or servers, the user can go back to the Network Map Window 302 by clicking on the "Close" button 440 or the "X" 402 at the top right corner of the Alert Manager Window 400.

Incoming Alert

Figure 11:
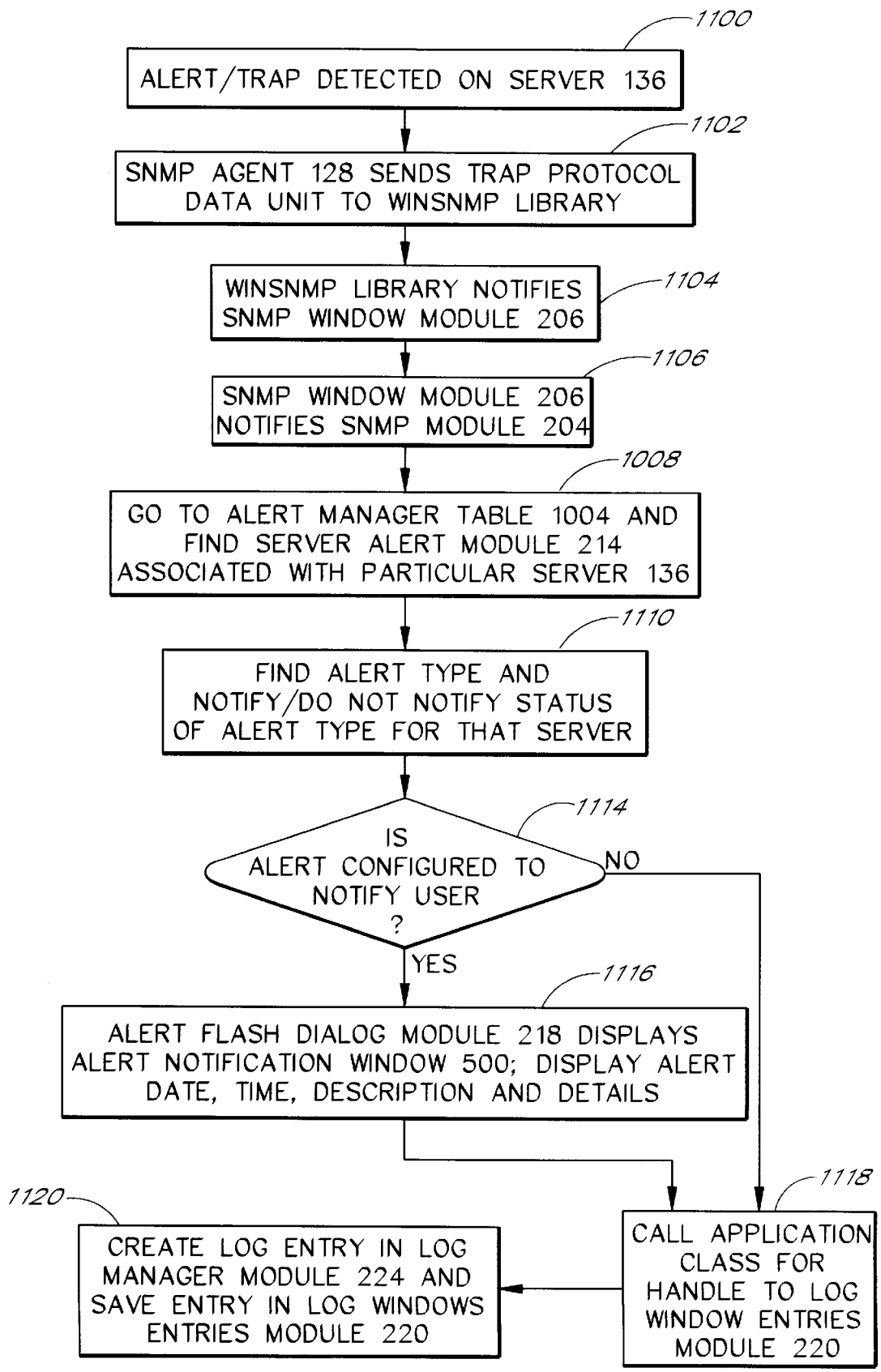
FIG. 11 illustrates one module-level process of how an alert is generated and handled by the alert configurator.

In general, when an alert is generated as shown in a block 1100 of FIG. 11, the SNMP agent 128 may send two pieces of information in a protocol data unit to the SNMP manager 108 (FIG. 1): (1) the trap type and (2) the number or name of the individual device where the trap was detected. This is shown in FIG. 11 as block 1102. The SNMP manager 108 automatically knows which server 136 generated the alert because in any SNMP communication the source address and destination address are part of the message.

The SNMP manager 108 may later go back to the SNMP agent 128 to find other information related to the failed device or environment condition, but this is a separate transaction torn the completed alert message.

Specifically, the WinSNMP Library 112 (FIGS. 1) receives the alert from the SNMP agent 128 in block 1102.

In block 1104, the WinSNMP Library 112 notifies the SNMP Window Module 206. In block 1106, the SNMP Window Module 206 notifies the SNMP Module 204. In block 1108, the SNMP Module 204 in turn goes to the Alert Manager Module 202 and finds the Server Alert Module 214 associated with the server 136 generated the alert. In block 1110, the SNMP Module 204 looks for the server name and alert type in the Alert Manager Table 1002 shown in FIG. 10. In block 1114, if the alert for that particular server is set on notify user, then the SNMP Module 204 retrieves the alert message associated with that particular alert type. These alert messages are listed in FIG. 48. In block 116, the Alert Manager Module 202 then calls the Alert Flash Dialog Module 218 and displays the Alert Notification Window as shown in FIG. 5.

In one embodiment of the invention, the Alert Manager Module 202 temporarily stores the data related to an incoming alert This data may include the name of the server, the alert type, the nine and date of the alert, the description of the alert type, and other details. The details may contain a recommended course of action for the user. The data related to an incoming alert may be displayed in an alert notification window by the Alert Flash Dialog Module 218. In one embodiment of the invention, the alert notification dialog box is called the Alert Notification Window 500. This is shown in FIG. 5. The Alert Notification Window 500 displays the name of the server 504, the date and time of the alert detected 506, a description of the alert type 510, and details of the alert 514. The Alert Notification Window 218 remains on the user's desktop until the user clicks on the "Close" button 508 or the "X" 502 at the top.

The Alert Manager Module 202 also sends the alert information to the Log Manager Module 224 FIG. 2) which creates or adds a log entry for that alert using the Log Windows Entries Module 220, as shown in blocks 1118–1120 of FIG. 11.

Figure 12:
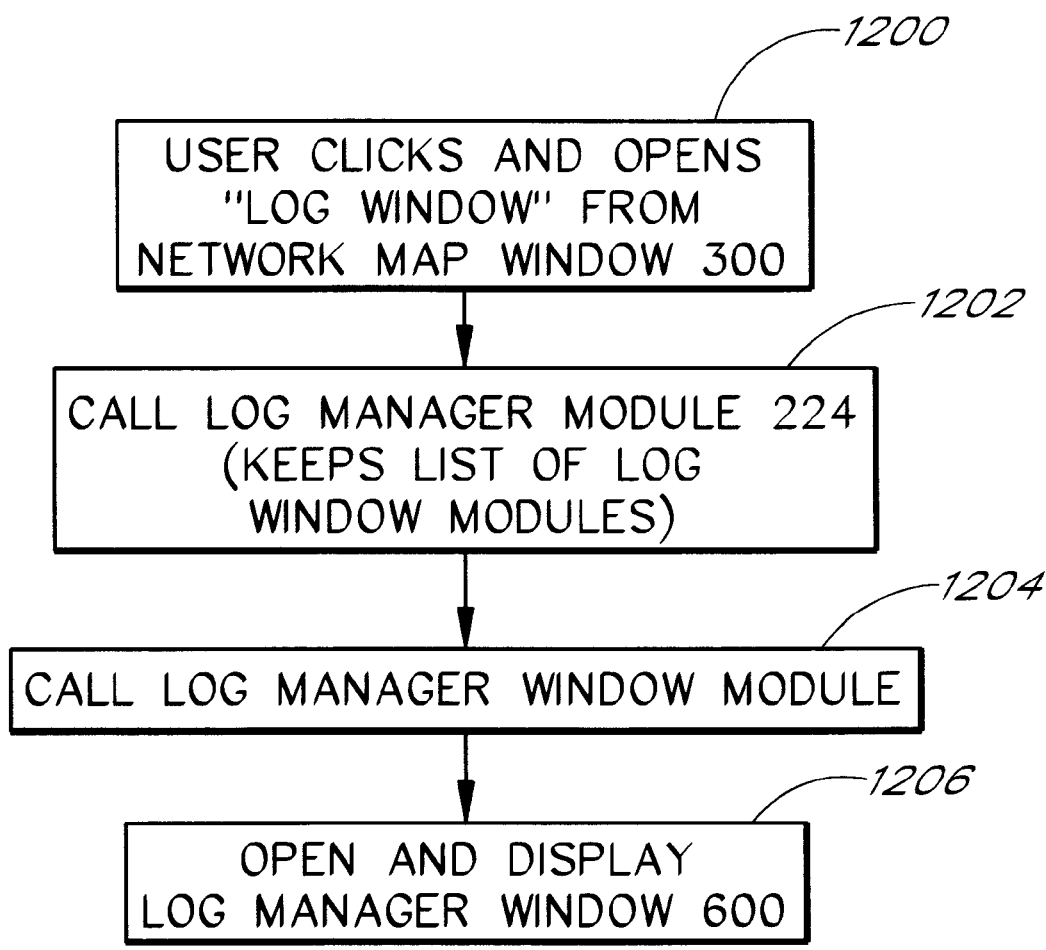
FIG. 12 illustrates one sequence of acts that occur when the user opens the Log Window.

FIG. 12 illustrates the module-level process of bow the user opens the Log Window 600 shown in FIG. 6. The user may open the Log Window 600 the same way the user opens the Alert Manager Window 400 as described above. Ea one embodiment of the present invention, the user can pull down the "Window" menu 304 from the top of the desktop 300 (FIG. 3) and select the "Log Window" menu item 306, as shown in block 1200. In block 1202, the Network Map Window Module 212 calls the Log Manager Module 224. In blocks 1204 and 1206, the Log Manager Module 224 then calls the Log Manager Window Module 222 and the Log Window Entries Module 220 to display the Log Widow 600 as shown in FIG. 6.

The Log Window 600 displays the server names 602, the alert log entry numbers 604, the dates and times of the alerts 606, the sources of the alerts 608, the category of the alerts 610, the descriptions of the alert types 612, and details of the alerts 614. The user can scroll up or down in the log file with the scroll button 616. In one embodiment of the invention, the text associated with each type of alert is hardcoded in the application itself, such as Maestro Central 107.

Advantages of One Embodiment of the Present Invention

One advantage of an embodiment of the present invention is that it avoids unwanted disruptions. This is particularly important in time-critical server management applications. The network administrator may not want to be integrated in his or her present task every time an SNMP agent 128 detects a minor malfunction or environment change in the server, One embodiment of the present invention allows the user to select the alerts he or she personally believes are important.

For example, a first-time user may with to view all types of alert notifications because he or she is unfamiliar with the network, the server type, the individual server components or the server manager software. This may be time-consuming, but a first-time user would rather be safe.

On the other hand, a more experienced network administrator may only want to view two or three types of alerts that he or she feels are significant. For instance, in one embodiment of the present invention, the system board fans of the server have at least twice the cooling capacity, which means if one fan ceases to operate another fan can handle tie extra load. A more experienced user may wish to see minor malfunctions, such as fan failures, stored in the log file at the end of the week or when he or she has time. This eliminates unwanted disruptions to the administrator's present work.

Another advantage of one embodiment of the claimed invention is its capability to quickly configure a customized list of alert notifications for each server in the network. For example, the user can delete the Adapter Alert 414 and the Canister Alert 416 notifications for one server and delete the Power Supply Alert 424, the Fan Alert 422, and the Temperature Sensor Alert 428 notifications for another server. Thus, each server in the network can have its own user-configured list of alerts This can be very useful if each server has a different environment or purpose in which only certain alert notifications are important and not others.

Furthermore, the user can do this in one window, the Alert Manager Window 400, at one time without opening and reopening this window. The Alert Manager Window 400 preferably does not close when the user finishes deleting or adding alert notifications. It closes only when the user decides to close it This saves time and reduces file probability of mistakes.

Another advantage of one embodiment of the present invention is that it saves the network administrator time to look up the type of alert generated, One embodiment of invention creates and displays a dialog box that automatically appears on the user's screen when an alert is received by the server manager. The user does not need to go looking for the alert by opening a dialog box or pulling down a menu item. One embodiment of invention gives the user data about the alert such as a full description of the alert, the time and date it was detected, and further instructions on what to do and the like.

Another advantage of one embodiment of the present invention is that by only sending user-selected alerts, it saves valuable bandwidth on the network. A major goal of network servers and system managers today is to reduce traffic packets on the network. In one embodiment of the invention, the explanatory text for each type of alert and other instructions is hardcoded into the SNMP manager 108 software. In this embodiment, the only message that the SNMP agent 128 sends is an identifier telling the SNMP manage 108 the type of alert and which server generated the alert. This further reduces traffic bottlenecks on the network and improves response times.

Another advantage of one embodiment of the present invention is that it facilitates removing and adding server components such as PCI boards without shutting down the whole server system (also known as HotPlug and HotAdd)

APPENDIX A

Incorporation by Reference of Commonly Owned Applications
The following patent applications, commonly owned and filed on the same day as the
present application are hereby incorporated herein in their entirety by reference thereto:

| Title | Application No. | Patent No. | Attorney Docket No. |
|---|---|---|---|
| "System Architecture for Remote Access and Control of Environmental Management" | 08/942,160 | | MNFRAME.002A1 |
| "Method of Remote Access and Control of Environmental Management" | 08/942,215 | 6,189,109 | MNFRAME.002A2 |
| "System for Independent Powering of Diagnostic Processes on a Computer System" | 08/942,410 | 6,202,160 | MNFRAME.002A3 |
| "Method of Independent Powering of Diagnostic Processes on a Computer System" | 08/942,320 | 6,134,668 | MNFRAME.002A4 |
| "Diagnostic and Managing Distributed Processor System" | 08/942,402 | | MNFRAME.005A1 |
| "Method for Managing a Distributed Processor System" | 08/942,448 | | MNFRAME.005A2 |
| "System for Mapping Environmental Resources to Memory for Program Access" | 08/942,222 | 6,122,758 | MNFRAME.005A3 |
| "Method for Mapping Environmental Resources to Memory for Program Access" | 08/942,214 | 6,199,173 | MNFRAME.005A4 |
| "Hot Add of Devices Software Architecture" | 08/942,309 | | MNFRAME.006A1 |
| "Method for The Hot Add of Devices" | 08/942,306 | | MNFRAME.006A2 |
| "Hot Swap of Devices Software Architecture" | 08/942,311 | 6,192,434 | MNFRAME.006A3 |
| "Method for The Hot Swap of Devices" | 08/942,457 | | MNFRAME.006A4 |
| "Method for the Hot Add of a Network Adapter on a System Including a Dynamically Loaded Adapter Driver" | 08/943,072 | 5,892,928 | MNFRAME.006A5 |
| "Method for the Hot Add of a Mass Storage Adapter on a System Including a Statically Loaded Adapter Driver" | 08/942,069 | 6,219,734 | MNFRAME.006A6 |
| "Method for the Hot Add of a Network Adapter On a System Including a Statically Loaded Adapter Driver" | 08/942,465 | 6,202,111 | MNFRAME.006A7 |
| "Method for the Hot Add of a Mass Storage Adapter on a System Including a Dynamically Loaded Adapter Driver" | 08/962,963 | 6,179,486 | MNFRAME.006A8 |
| "Method for the Hot Swap of a Network Adapter on a System Including a Dynamically Loaded Adapter Driver" | 08/943,078 | 5,889,965 | MNFRAME.006A9 |
| "Method for the Hot Swap of a Mass Storage Adapter on a System Including a Statically Loaded Adapter Driver" | 08/942,336 | | MNFRAME.006A10 |
| Method for the Hot Swap of a Network Adapter on a System Including a Statically Loaded Adapter Driver" | 08/942,459 | 6,170,028 | MNFRAME.006A11 |
| "Method for the Hot Swap of a Mass Storage Adapter on a System Including a Dynamically Loaded Adapter Driver" | 08/942,458 | 6,173,346 | MNFRAME.006A12 |
| "Method of Performing an Extensive Diagnostic Test in Conjunction with a BIOS Test Routine" | 08/942,463 | 6,035,420 | MNFRAME.008A |
| "Apparatus for Performing an Extensive Diagnostic Test in Conjunction with a BIOS Test Routine" | 08/942,163 | 6,009,541 | MNFRAME.009A |

APPENDIX A-continued

Incorporation by Reference of Commonly Owned Applications
The following patent applications, commonly owned and filed on the same day as the present application are hereby incorporated herein in their entirety by reference thereto:

| Title | Application No. | Patent No. | Attorney Docket No. |
|---|---|---|---|
| "Configuration Management Method for Hot Adding and Hot Replacing Devices" | 08/941,268 | 6,148,355 | MNFRAME.010A |
| "Configuration Management System for Hot Adding and Hot Replacing Devices" | 08/942,408 | 6,243,773 | MNFRAME.011A |
| "Apparatus for Interfacing Buses" | 08/942,382 | 6,182,180 | MNFRAME.012A |
| "Method for Interfacing Buses" | 08/942,413 | 5,987,554 | MNFRAME.013A |
| "Computer Fan Speed Control Device" | 08/942,447 | 5,990,582 | MNFRAME.016A |
| "Computer Fan Speed Control Method" | 08/942,216 | 5,962,933 | MNFRAME.017A |
| "System for Powering Up and Powering Down a Server" | 08/943,076 | 6,122,746 | MNFRAME.018A |
| "Method of Powering Up and Powering Down a Server" | 08/943,077 | 6,163,849 | MNFRAME.019A |
| "System for Resetting a Server" | 08/942,333 | 6,065,053 | MNFRAME.020A |
| "Method of Resetting a Server" | 08/942,405 | | MNFRAME.021A |
| "System for Displaying Flight Recorder" | 08/942,070 | 6,138,250 | MNFRAME.022A |
| "Method of Displaying Flight Recorder" | 08/942,068 | 6,073,255 | MNFRAME.023A |
| "Synchronous Communication Interface" | 08/943,355 | 6,219,711 | MNFRAME.024A |
| "Synchronous Communication Emulation" | 08/942,004 | 6,068,661 | MNFRAME.025A |
| "Software System Facilitating the Replacement or Insertion of Devices in a Computer System" | 08/942,317 | 6,134,615 | MNFRAME.026A |
| "Method for Facilitating the Replacement or Insertion of Devices in a Computer System" | 08/942,316 | 6,134,614 | MNFRAME.027A |
| "System Management Graphical User Interface" | 08/943,357 | | MNFRAME.028A |
| "Display of System Information" | 08/942,195 | 6,046,742 | MNFRAME.029A |
| "Data Management System Supporting Hot Plug Operations on a Computer" | 08/942,129 | 6,105,089 | MNFRAME.030A |
| "Data Management Method Supporting Hot Plug Operations on a Computer" | 08/942,124 | 6,058,445 | MNFRAME.031A |
| "Alert Configurator and Manager" | 08/942,005 | | MNFRAME.032A |
| "Managing Computer System Alerts" | 08/943,356 | | MNFRAME.033A |
| "Computer Fan Speed Control System" | 08/940,301 | | MNFRAME.034A |
| "Computer Fan Speed Control System Method" | 08/941,267 | | MNFRAME.035A |
| "Black Box Recorder for Information System Events" | 08/942,381 | | MNFRAME.036A |
| "Method of Recording Information System Events" | 08/942,164 | | MNFRAME.037A |
| "Method for Automatically Reporting a System Failure in a Server" | 08/942,168 | 6,243,838 | MNFRAME.040A |
| "System for Automatically Reporting a System Failure in a Server" | 08/942,384 | 6,170,067 | MNFRAME.041A |
| "Expansion of PCI Bus Loading Capacity" | 08/942,404 | | MNFRAME.042A |
| "Method for Expanding PCI Bus Loading Capacity" | 08/942,223 | 6,195,717 | MNFRAME.043A |
| "System for Displaying System Status" | 08/942,347 | 6,145,098 | MNFRAME.044A |
| "Method of Displaying System Status" | 08/942,071 | 6,088,816 | MNFRAME.045A |
| "Fault Tolerant Computer System" | 08/942,194 | 6,175,490 | MNFRAME.046A |
| "Method for Hot Swapping of Network Components" | 08/943,044 | | MNFRAME.047A |

APPENDIX A-continued

Incorporation by Reference of Commonly Owned Applications
The following patent applications, commonly owned and filed on the same day as the present application are hereby incorporated herein in their entirety by reference thereto:

| Title | Application No. | Patent No. | Attorney Docket No. |
|---|---|---|---|
| "A Method for Communicating a Software Generated Pulse Waveform Between Two Servers in a Network" | 08/942,221 | 6,163,853 | MNFRAME.048A |
| "A System for Communicating a Software Generated Pulse Waveform Between Two Servers in a Network" | 08/942,409 | | MNFRAME.049A |
| "Method for Clustering Software Applications" | 08/942,318 | 6,134,673 | MNFRAME.050A |
| "System for Clustering Software Applications" | 08/942,411 | | MNFRAME.051A |
| "Method for Automatically Configuring a Server after Hot Add of a Device" | 08/942,319 | 6,212,585 | MNFRAME.052A |
| "System for Automatically Configuring a Server after Hot Add of a Device" | 08/942,331 | | MNFRAME.053A |
| "Method of Automatically Configuring and Formatting a Computer System and Installing Software" | 08/942,412 | 6,154,835 | MNFRAME.054A |
| "System for Automatically Configuring and Formatting a Computer System and Installing Software" | 08/941,955 | 6,138,179 | MNFRAME.055A |
| "Determining Slot Numbers in a Computer" | 08/942,462 | | MNFRAME.056A |
| "System for Detecting Errors in a Network" | 08/942,169 | | MNFRAME.058A |
| "Method of Detecting Errors in a Network" | 08/940,302 | | MNFRAME.059A |
| "System for Detecting Network Errors" | 08/942,407 | | MNFRAME.060A |
| "Method of Detecting Network Errors" | 08/942,573 | | MNFRAME.061A |

What is claimed is:

1. A manager system for monitoring alerts regarding the status of components in an agent computer, the manager system comprising:
  at least one processor, said processor configured to display a plurality of alert types to a user in a graphic display, each of said alert types corresponding to a status of components in the computer, said processor enter configured to receive a plurality of unfiltered alerts from the agent computer, said alerts corresponding to an alert type; and
  an alert module executing in said processor, said alert module configured to allow a user to selectively disable or enable a future display of one or more alert notifications related to said alerts to the user at the manager system by selecting or deselecting a corresponding alert type in said graphic display, said alert module further configured to record said status information associated with said alerts in a storage medium.

2. The apparatus of claim 1 wherein said alert module contains a plurality of variables, some of said variables indicating whether each of said alerts is disabled or enabled to be displayed to the user at the manager system.

3. The apparatus of claim 1 wherein said alert module records information about said disabled alerts in said storage medium in the manager system.

4. The apparatus of claim 1, further comprising a log module in the manager system, said log module configured to store information about said enabled and disabled alerts.

5. The apparatus of claim 4, wherein said log module stores a name of said component associated with one of said alerts.

6. The apparatus of claim 4, wherein said log module stores a recommended course of action associated with one of said alerts.

7. The apparatus of claim 1 further comprising a user interface which allows a user to select one or more of said alerts for automatic display to the user by providing a description of said alerts.

8. The apparatus of claim 7, wherein said user interface is configured to enable said selected alerts in response to an enable command.

9. The apparatus of claim 7, wherein said user interface is further configured to disable said selected alerts in response to a disable command.

10. The apparatus of claim 1 wherein said alerts which were not selectively disabled for display by the user are displayed in an alert notification window to the user.

11. The apparatus of claim 10 wherein said alert notification window is configured to display the name of said component associated with one of said alerts.

12. The apparatus of claim 10, wherein said alert notification window is configured to display the recommended course of action associated with one of said alerts.

13. An apparatus for monitoring the operational status of components in a computer, comprising:
  a first computer comprising a plurality of components, said first computer configured to generate a notification regarding the status of at least one of said components, said notification comprising a first code which contains data about said component, said first code having a first data length; and a status module existing in a second computer, said status module configured to receive said notification unfiltered from said first computer, said status module further configured to allow a user to selectively disable or enable a future display of said notification by selecting or deselecting a corresponding notification type in a graphic display, said status module further configured to transform said notification into a user-friendly display message and automatically display the message, the message comprising a second data length, wherein said second data length is significantly greater than said first data length.

14. The apparatus of claim 13 wherein said first computer and said second computer are connected by a computer network.

15. The apparatus of claim 14 wherein said computer network performs Simple Network Management Protocol transactions.

16. The apparatus of claim 13 wherein said first code contains an index wherein said status module uses said index to identify said user-friendly display message.

17. The apparatus of claim 16 wherein said index is predefined by a management information base.

18. The apparatus of claim 17 wherein said management information base associates information about said component with said index.

19. The apparatus of claim 17 wherein said status module uses said information about said component from said management information base to generate said user-friendly display message.

20. The apparatus of claim 13 wherein said user-friendly display message provides a description of said notification.

21. The apparatus of claim 13 wherein said user-friendly display message provides a recommended course of action for said notification.

22. An apparatus for monitoring the operational status of components in a computer, comprising:

a first computer comprising a plurality of components;

a management information base existing in a second computer, said management information base configured to associate a plurality of indexes with different operational parameters related to said components;

at least one alert, said alert providing information about a change in one of said operational parameters, said alert comprising one index of said indexes which identifies at least one of said operational parameters;

an alert module existing in said second computer, said alert module configured to receive said alert unfiltered from said first computer, said alert module further configured to allow a user to selectively disable or enable a future display of said alert by selecting or deselecting a corresponding alert type in a graphic display, said alert module further configured to access said management information base to transform said index into an automatically displayable user-friendly message.

23. The apparatus of claim 22, wherein said index is a variable in said first management information base.

24. The apparatus of claim 23, wherein said variable is compatible with a computer network which performs Simple Network Management Protocol transactions.

25. An apparatus for displaying a system management user interface, comprising:

an agent computer, said agent computer comprising a plurality of components, said agent computer configured to send a plurality of unfiltered alerts to a manager computer, said alerts associated with status information of said plurality of components;

a display executing in the manager computer, said display configured to allow a user to select at least two of said alerts; and an alert manager module executing in the manager computer, said alert manager module configured to enable or disable a future display of any combination of selected said alerts in response to a single command from the user, said single command corresponding to a selection of an alert type in a graphic display by said user.

26. The apparatus of claim 25, wherein said alerts are associated with the status of a plurality of components in a plurality of network servers.

27. The apparatus of claim 25, wherein said display allows the user to select at least two alerts corresponding to at least two servers.

28. The apparatus of claim 25 wherein one of said alerts relates to the status of a central processing unit.

29. The apparatus of claim 25 wherein one of said alerts relates to the status of a fan.

30. The apparatus of claim 25 wherein one of said alerts relates to the status of a temperature sensor.

31. The apparatus of claim 25 wherein one of said alerts relates to the status of a power supply.

32. The apparatus of claim 25 wherein one of said alerts relates to the status of a fault isolation unit.

33. An apparatus for monitoring the operational status of components in a computer, comprising:

a first and a second computer interconnected with a network, said first computer comprising a plurality of components;

a first means for associating a plurality of indexes with different operational parameters related to said components, portions of said first means existing in said second computer;

at least one alert, said alert providing information about a change in one of said operational parameters, said alert comprising one index of said indexes which identifies at least one of said operational parameters;

a second means existing in said second computer, said second means configured to receive said alert unfiltered from said first computer, said second means further configured to allow a user to selectively disable or enable a future display of said alert by selecting or deselecting a corresponding alert type in a graphic display, said second means further configured to access said first means to transform said index into an automatic user-friendly display message.

34. A manager system for monitoring alerts regarding the status of components in an agent computer, the manager system comprising:

at least one processor, said processor configured to display a plurality of alert types to a user in a graphic display, each of said alert types corresponding to a status of components in the computer, said processor further configured to receive a plurality of unfiltered alerts from the agent computer, said alerts corresponding to an alert type; and a user interface providing a description of said alerts to the user, the user interface configured to allow a user to selectively disable automatic display of one or more of said alerts by selecting or deselecting in said user interface at least one alert type corresponding to said alerts.

* * * * *

(12) EX PARTE REEXAMINATION CERTIFICATE (9676th)

United States Patent
Chari et al.

(10) Number: US 6,425,006 C1
(45) Certificate Issued: *May 24, 2013

(54) ALERT CONFIGURATION AND MANAGER

(75) Inventors: Srikumar N. Chari, Cupertino, CA (US); Kenny L. Bright, Hayward, CA (US)

(73) Assignee: Round Rock Research, LLC, Mt. Kisco, NY (US)

Reexamination Request:
No. 90/012,326, May 30, 2012

Reexamination Certificate for:
Patent No.: 6,425,006
Issued: Jul. 23, 2002
Appl. No.: 08/942,005
Filed: Oct. 1, 1997

(*) Notice: This patent is subject to a terminal disclaimer.

Related U.S. Application Data

(60) Provisional application No. 60/046,310, filed on May 13, 1997.

(51) Int. Cl.
*H04L 12/24* (2006.01)

(52) U.S. Cl.
USPC .......... 709/224; 709/202; 709/203; 709/223; 370/242; 714/37; 714/47.3; 714/48

(58) Field of Classification Search
None
See application file for complete search history.

(56) References Cited

To view the complete listing of prior art documents cited during the proceeding for Reexamination Control Number 90/012,326, please refer to the USPTO's public Patent Application Information Retrieval (PAIR) system under the Display References tab.

*Primary Examiner* — Dennis Bonshock

(57) ABSTRACT

An apparatus for creating, registering, and monitoring alerts for a computer or plurality of computers. This apparatus alerts the operator when an event occurs on one of the completer's components. This apparatus allows the user to select which alerts to enable and which alerts to disable from a list of all possible alerts. When an alert occurs, the present invention displays the particular computer's name, a description of the alert, the time and date of the alert; and details about a recommended course of action. The present invention also creates a log file for all alerts detected, regardless of whether the alert is displayed or not.

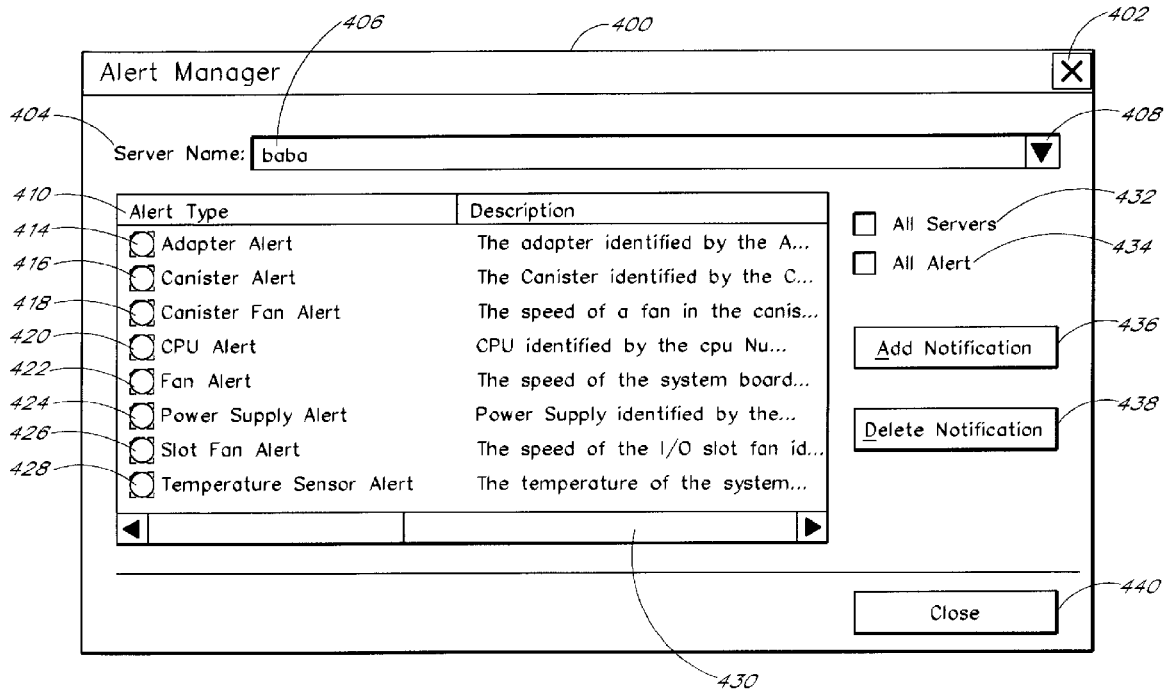

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 25-33 are cancelled.

Claims 1, 13, 22 and 34 are determined to be patentable as amended.

Claims 2-12, 14-21 and 23-24, dependent on an amended claim, are determined to be patentable.

New claims 35-61 are added and determined to be patentable.

1. A manager system for monitoring alerts regarding the status of components in an agent computer, the manager system comprising:
   at least one processor, said processor configured to display a plurality of alert types to a user in a graphic display, each of said alert types corresponding to a status of components in the computer, said processor [enter] configured to receive a plurality of unfiltered alerts from the agent computer, said alerts corresponding to an alert type; and
   an alert module executing in said processor, said alert module configured to allow a user to selectively disable or enable a future display of one or more alert notifications related to said alerts to the user at the manager system by selecting or deselecting a corresponding alert type in said graphic display, said alert module further configured to record said status information associated with said alerts in a storage medium;
   *wherein said plurality of alerts are generated by an independently powered self-contained distributed service microprocessor network disposed on said agent computer, said independently powered self-contained distributed service microprocessor network configured to generate said alerts at least during periods of non-operation of an operating system of said agent computer.*

13. An apparatus for monitoring the operational status of components in a computer, comprising:
    a first computer comprising a plurality of components, said first computer configured to generate a notification *from one or more microprocessors of an independently powered self-contained distributed service microprocessor network* regarding the status of at least one of said components *regardless of the operating status of the first computer*, said notification comprising a first code which contains data about said component, said first code having a first data length; and
    a status module existing in a second computer, said status module configured to receive said notification unfiltered from said first computer, said status module further configured to allow a user to selectively disable or enable a future display of said notification by selecting or deselecting a corresponding notification type in a graphic display, said status module further configured to transform said notification into a user-friendly display message and automatically display the message, the message comprising a second data length, wherein said second data length is significantly greater than said first data length;
    *wherein said operating status comprises a non-functioning state of any of one or more system processors disposed on said first computer.*

22. An apparatus for monitoring the operational status of components in a computer, comprising:
    a first computer comprising a plurality of components;
    a management information base existing in a second computer, said management information base configured to associate a plurality of indexes with different operational parameters related to said components;
    at least one alert, said alert providing information about a change in one of said operational parameters, said alert comprising one index of said indexes which identifies at least one of said operational parameters;
    *an independently powered self-contained distributed service microprocessor network disposed on said first computer, said independently powered self-contained distributed service microprocessor network configured to generate the at least one alert during a period of non-operation of a system processor of said first computer;*
    an alert module existing in said second computer, said alert module configured to receive said alert unfiltered from said first computer, said alert module further configured to allow a user to selectively disable or enable a future display of said alert by selecting or deselecting a corresponding alert type *of a plurality of alert types* in a graphic display, *each of said alert types corresponding respectively to a particular hardware component of said first computer,* said alert module further configured to access said management information base to transform said index into an automatically displayable user-friendly message.

34. A manager system for monitoring alerts regarding the status of components in an agent computer, the manager system comprising:
    at least one processor, said processor configured to display a plurality of alert types to a user in a graphic display, each of said alert types corresponding to a status of components in the computer, said processor further configured to receive a plurality of unfiltered alerts from the agent computer, said alerts corresponding to an alert type; and
    a user interface providing a description of said alerts to the user, the user interface configured to allow a user to selectively disable automatic display of one or more of said alerts by selecting or deselecting in said user interface at least one alert type corresponding to said alerts;
    *wherein said agent computer comprises an independently-powered self-contained distributed service microprocessor network configured to generate said plurality of unfiltered alerts.*

35. The manager system of claim 34, wherein at least a portion of the alert types are directed towards an environmental condition in the agent computer.

36. The manager system of claim 35, wherein at least a portion of the alert types are directed towards a component malfunction.

37. The manager system of claim 36, wherein a given alert is stored in a log file even if a user has chosen to selectively disable automatic display of the given alert.

38. The manager system of claim 36, wherein at least a portion of the alert types are generated by one or more microprocessors.

39. The manager system of claim 38, wherein the alert types are generated by a self-contained network of distributed microprocessors.

40. The manager system of claim 38, further comprising a module that acts as a repository of server information.

41. The manager system of claim 38, wherein said alerts are associated with the status of a plurality of components in a plurality of network servers.

42. The manager system of claim 41, wherein said display allows the user to select at least two alerts corresponding to at least two servers.

43. The manager system of claim 42, wherein one of said alerts relates to the status of a central processing unit.

44. The manager system of claim 43, wherein one of said alerts relates to the status of a fan.

45. The manager system of claim 44, wherein one of said alerts relates to the status of a temperature sensor.

46. The manager system of claim 45, wherein one of said alerts relates to the status of a power supply.

47. The manager system of claim 36, wherein at least a portion of alert types are organized according to components in the computer.

48. A manager system for monitoring alerts regarding a status of components in an agent computer, said manager system comprising:
  a storage medium;
  an interface in communication with a display apparatus configured to display a graphic display to a user;
  at least one processor, said processor configured to display a plurality of alert types to a user in a graphic display, each of said alert types corresponding to a status of hardware components in the computer, said processor enter configured to receive a plurality of unfiltered alerts from the agent computer, said alerts corresponding to an alert type; and
  an alert module executing in said processor, said alert module configured to allow a user to selectively disable or enable a future display of one or more alert notifications related to said alerts to the user at the manager system by selecting or deselecting a corresponding alert type in said graphic display, said alert module further configured to record said status information associated with said alerts in the storage medium;
  wherein the plurality of unfiltered alerts are generated by a self-contained distributed service network of microprocessors disposed on the agent computer, at least one microprocessor of said self-contained distributed service network of microprocessors being configured for operation on independent power so as to allow transmission of said alerts regardless of the operating status of the agent computer.

49. The apparatus of claim 48, wherein said alert module comprises a plurality of variables, individual ones of said variables indicating whether respective ones of said alerts is disabled or enabled.

50. The apparatus of claim 48, wherein said storage medium is further configured to store a recommended course of action associated with at least one of said alerts.

51. The apparatus of claim 48, further comprising a user interface configured to enable a user to select one or more of said alerts for automatic display to said user by providing a description of said alerts.

52. The apparatus of claim 48, wherein said alerts which were not selectively disabled are displayed in an alert notification window to said user.

53. The apparatus of claim 52 wherein said alert notification window is configured to display a name of said hardware component associated with an individual one of said alerts.

54. The apparatus of claim 52, wherein said alert notification window is configured to display a recommended course of action associated with one of said alerts.

55. The apparatus of claim 48, wherein said processor is further configured to:
  enable said user to select at least two of said alerts; and
  based at least in part on a selection of a single command, enable or disable a future display of any combination of said selected at least two alerts, said single command corresponding to a selection of an alert type in said graphic display by said user.

56. The apparatus of claim 55, wherein said selected at least two alerts are associated with a status of a plurality of components in a plurality of network servers.

57. The apparatus of claim 55, wherein at least one of said selected at least two alerts relates to the status of a central processing unit.

58. The apparatus of claim 55, wherein at least one of said selected at least two alerts relates to the status of a fan.

59. The apparatus of claim 55, wherein at least one of said selected at least two alerts relates to the status of a temperature sensor.

60. The apparatus of claim 55, wherein at least one of said selected at least two alerts relates to the status of a power supply.

61. The apparatus of claim 55, wherein at least one of said selected at least two alerts relates to the status of a fault isolation unit.

* * * * *